(12) United States Patent
Young et al.

(10) Patent No.: US 12,099,970 B2
(45) Date of Patent: Sep. 24, 2024

(54) VALIDATING SECURE MODIFICATIONS TO INFORMATION HANDLING SYSTEMS

(71) Applicant: Dell Products, L.P., Round Rock, TX (US)

(72) Inventors: Jason Matthew Young, Round Rock, TX (US); Marshal F. Savage, Austin, TX (US); Mukund P. Khatri, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 18/479,274

(22) Filed: Oct. 2, 2023

(65) Prior Publication Data

US 2024/0037501 A1    Feb. 1, 2024

Related U.S. Application Data

(62) Division of application No. 17/137,976, filed on Dec. 30, 2020, now Pat. No. 11,810,062.

(51) Int. Cl.
*G06Q 10/087* (2023.01)
*G06F 21/73* (2013.01)
*G06Q 10/0833* (2023.01)

(52) U.S. Cl.
CPC .......... *G06Q 10/087* (2013.01); *G06F 21/73* (2013.01); *G06Q 10/0833* (2013.01)

(58) Field of Classification Search
CPC .. G06Q 10/087; G06Q 10/0833; G06F 21/73; G06F 21/57; G06F 21/575; G06F 21/71
See application file for complete search history.

(56) References Cited

U.S. PATENT DOCUMENTS

| | | | | |
|---|---|---|---|---|
| 2011/0255690 A1* | 10/2011 | Kocher | ................. | H04L 9/3249 380/210 |
| 2014/0189336 A1* | 7/2014 | Ballesteros | ........... | G06F 21/575 713/2 |
| 2014/0344159 A1* | 11/2014 | Savage | .................. | G06Q 99/00 705/59 |
| 2014/0358792 A1* | 12/2014 | Berke | .................. | G06Q 30/018 705/50 |
| 2014/0359303 A1* | 12/2014 | Berke | .................. | G06F 21/572 713/189 |

(Continued)

*Primary Examiner* — Michael Jared Walker
(74) *Attorney, Agent, or Firm* — Fogarty LLP

(57) ABSTRACT

Various embodiments provide methods for validating hardware modifications of an IHS (Information Handling System) by confirming that a hardware modification corresponds to a hardware component supplied for installation in the IHS by a trusted entity. During factory provisioning of an IHS, an inventory certificate that specifies the factory installed IHS hardware is uploaded to the IHS and is also stored for ongoing support of the IHS. Upon a hardware component being supplied for installation in the IHS by a trusted entity, the inventory of the stored inventory certificate is updated to identify the supplied component and the updated certificate is transmitted to the IHS. An inventory of detected hardware components of the IHS is compared against the inventory from the updated inventory certificate in order to validate the detected hardware of the IHS includes the component, supplied by the trusted entity, that is identified in the updated inventory certificate.

20 Claims, 11 Drawing Sheets

(56) References Cited

U.S. PATENT DOCUMENTS

| | | | | |
|---|---|---|---|---|
| 2015/0244708 A1* | 8/2015 | Ballard | ............... | H04L 63/0823 |
| | | | | 726/6 |
| 2016/0048389 A1* | 2/2016 | Paulraj | ................... | G06F 8/654 |
| | | | | 717/170 |
| 2016/0364243 A1* | 12/2016 | Puthillathe | ............ | G06F 9/4411 |
| 2017/0187695 A1* | 6/2017 | Narayanan | ............ | H04L 9/0897 |
| 2017/0243021 A1* | 8/2017 | Gupta | ................. | G06F 21/6218 |
| 2017/0366536 A1* | 12/2017 | Robison | ............... | H04L 9/3226 |
| 2018/0075242 A1* | 3/2018 | Khatri | ................... | H04L 9/3263 |
| 2019/0042707 A1* | 2/2019 | Young | ................... | G06F 21/604 |
| 2019/0340364 A1* | 11/2019 | Liu | ....................... | H04L 9/0894 |
| 2019/0392148 A1* | 12/2019 | Ganesan | ............. | G06F 9/4411 |
| 2020/0132761 A1* | 4/2020 | Rahardjo | ........... | G01R 31/3177 |
| 2020/0137079 A1* | 4/2020 | Jreij | .................... | G06F 13/4282 |
| 2020/0250344 A1* | 8/2020 | Rahn | ..................... | H04L 9/3236 |
| 2021/0064786 A1* | 3/2021 | Leinfellner | ........... | H04L 9/0894 |

\* cited by examiner

VALIDATING SECURE MODIFICATIONS TO INFORMATION HANDLING SYSTEMS

CROSS REFERENCE TO RELATED APPLICATIONS

This patent application claims priority to, and is a division of co-pending, commonly assigned U.S. patent application Ser. No. 17/137,976, filed Dec. 30, 2020 and also entitled "Validating Secure Modifications to Information Handling Systems," and which is hereby incorporated herein by reference.

FIELD

The present disclosure relates generally to Information Handling Systems (IHSs), and relates more particularly to IHS security.

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Some types of IHSs, such as mobile phones and tablets, are typically manufactured in large quantities and with few variations. For instance, for a particular model of mobile phone or tablet, hundreds of thousands of identical, or nearly identical, devices may be manufactured. Other types of IHSs, such as rack-mounted servers, are manufactured in much smaller quantities and are frequently manufactured and customized according to specifications provided by a specific customer that has contracted for the manufacture and delivery of the server. In such instances, a customer may specify various hardware and/or software customizations that configure the server to support specific functionality. For example, a customer may contract for manufacture and delivery of a server that includes security adaptations that will enable the server to securely process high volumes of financial transactions. However, such security adaptations may be circumvented by malicious actors by surreptitiously replacing factory installed hardware components of an IHS with compromised hardware components. To a certain extent, IHSs that are mass produced, such as tablets, may be similarly compromised by replacement of factory installed hardware components. Each time a hardware component on an IHS is replaced or a new hardware component is installed to an IHS, an opportunity is presented for a malicious actor to substitute a compromised hardware component for a genuine hardware component.

SUMMARY

Various embodiments provide methods for validating hardware components of an IHS (Information Handling System). The methods may include: during factory provisioning of the IHS, storing an original inventory certificate that includes an inventory identifying a plurality of hardware components installed during factory assembly of the IHS; supplying a first hardware component for installation in the IHS; updating the stored inventory certificate to identify the supplied first hardware component in the inventory of the certificate; transmitting the updated inventory certificate to the IHS; collecting, by a validation process of the IHS, an inventory of the detected hardware components of the IHS; and comparing the collected inventory against the inventory from the updated inventory certificate in order to validate the collected inventory includes the first hardware component identified in the updated inventory certificate.

In additional method embodiments, the supplying of the first hardware component comprises shipping the first hardware component for installation in the IHS or selling the first hardware component via a retail transaction. In additional method embodiments, during the factory provisioning of the IHS, the original inventory certificate is additionally uploaded to the IHS. In additional method embodiments, the original inventory certificate is uploaded to a persistent memory of the IHS during the factory provisioning of the IHS. In additional method embodiments, the updated inventory certificate is uploaded to the persistent memory and replaces the original inventory certificate. In additional method embodiments, the first hardware components comprises at least one of a storage drive, a network controller, an I/O controller, a power supply unit, a storage controller, a memory module, an FPGA (Field-Programmable Gate Array) card, a graphics card, a cooling component and a sensor. In additional method embodiments, the validation process comprises a pre-boot process of the IHS. In additional method embodiments, the comparison further comprises comparing the collected inventory against the inventory from the updated inventory certificate in order to identify any discrepancies between the detected hardware components of the IHS and the hardware components installed during factory assembly of the IHS.

Various additional embodiments provide additional methods for validating hardware components of an IHS. The additional methods may include: during factory provisioning of the IHS, storing an original inventory certificate that includes an inventory identifying a plurality of hardware components installed during factory assembly of the IHS; supplying a first hardware component for installation in the IHS; receiving a certificate signing request from the IHS that specifies an inventory of detected hardware components of the IHS; confirming the first hardware component is identified in the inventory of the certificate signing request; generating a new inventory certificate that includes the inventory of detected hardware components of the IHS; and transmitting the new inventory certificate to the IHS.

In additional method embodiments, the supplying of the first hardware component comprises shipping the first hardware component for installation in the IHS or selling the first hardware component via a retail transaction. In additional method embodiments, the first hardware component comprises at least one of a motherboard and a backplane. In additional method embodiments, during the factory provisioning of the IHS, the original inventory certificate is additionally uploaded to a persistent memory the IHS. In additional method embodiments, the new inventory certificate that is transmitted to the IHS is stored to the persistent memory of the IHS and replaces the original inventory certificate. In additional method embodiments, comparing the inventory of hardware components installed during factory assembly of the IHS from the original inventory certificate against the inventory of detected hardware components specified in the certificate signing request. In additional method embodiments, wherein the comparison identifies any hardware components detected by the IHS that are not factory installed hardware components.

Various additional embodiments provide IHSs that may include: a plurality of hardware components, wherein during factory provisioning of the IHS an original inventory certificate is uploaded to the IHS, wherein the original inventory certificate includes an inventory that identifies factory installed hardware components of the IHS, and wherein the plurality of hardware components comprise: one or more processors; one or more memory devices coupled to the processors, the memory devices storing computer-readable instructions that, upon execution by the processors, cause a validation process of the IHS to: compare the plurality of hardware components against the inventory from the original inventory certificate in order to identify any of the plurality of hardware components that were not installed during factory assembly of the IHS; detect an installation of a first hardware component; receive an updated inventory certificate that includes an inventory that identifies a plurality of hardware components supplied by a trusted entity for installation in the IHS; and compare the first hardware component against the inventory from the updated inventory certificate in order to confirm the first hardware component was supplied by the trusted entity.

In additional IHS embodiments, inventory included in the original inventory certificate is based on a manifest of uniquely identifiable hardware components installed during the factory assembly of the IHS. In additional IHS embodiments, the plurality of hardware components further comprises a remote access controller, and wherein the original inventory certificate is uploaded to the IHS via the remote access controller during the factory provisioning of the IHS. In additional IHS embodiments, the updated inventory certificate replaces the original inventory certificate. In additional IHS embodiments, the first hardware component comprises at least one of a storage drive, a network controller, an I/O controller, a power supply unit, a storage controller, a memory module, an FPGA (Field-Programmable Gate Array) card, a graphics card, a cooling component and a sensor.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

DETAILED DESCRIPTION

Figure 1:
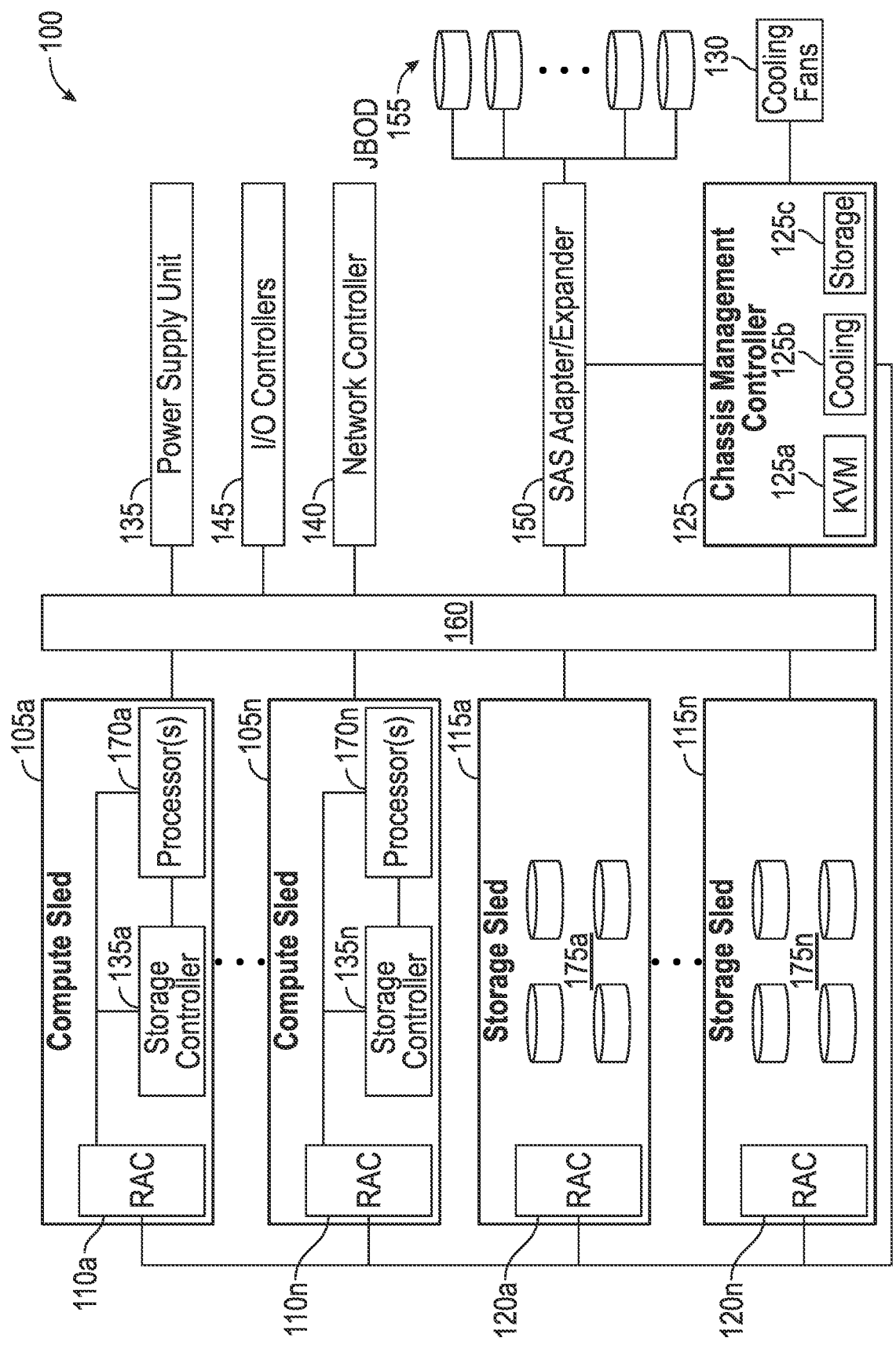
FIG. 1 is a diagram illustrating certain components of a chassis, according to some embodiments, for supporting validation of secure modifications to the components of the chassis.

FIG. 1 is a block diagram illustrating certain components of a chassis 100 comprising one or more compute sleds 105a-n and one or more storage sleds 115a-n that may be configured to implement the systems and methods described herein for supporting the validation of secure modifications to the components of the chassis 100. Embodiments of chassis 100 may include a wide variety of different hardware configurations. Such variations in hardware configuration may result from chassis 100 being factory assembled to include components specified by a customer that has contracted for manufacture and delivery of chassis 100. Upon delivery and deployment of an IHS, an IHS may be modified by replacing various hardware components of the IHS or by installing new hardware components to the IHS. As described in additional detail below, chassis 100 may include capabilities that allow a customer to validate that modifications to the hardware components of chassis 100 are secure and, in particular, to validate that hardware installed by a customer in chassis 100 is the same hardware that was supplied to the customer.

Chassis 100 may include one or more bays that each receive an individual sled (that may be additionally or alternatively referred to as a tray, blade, and/or node), such as compute sleds 105a-n and storage sleds 115a-n. Chassis 100 may support a variety of different numbers (e.g., 4, 8, 16, 32), sizes (e.g., single-width, double-width) and physical configurations of bays. Other embodiments may include additional types of sleds that provide various types of storage and/or processing capabilities. Other types of sleds may provide power management and networking functions. Sleds may be individually installed and removed from the chassis 100, thus allowing the computing and storage capabilities of a chassis to be reconfigured by swapping the sleds with different types of sleds, in many cases without affecting the operations of the other sleds installed in the chassis 100.

Multiple chassis 100 may be housed within a rack. Data centers may utilize large numbers of racks, with various different types of chassis installed in the various configurations of racks. The modular architecture provided by the sleds, chassis and rack allow for certain resources, such as cooling, power and network bandwidth, to be shared by the compute sleds 105a-n and storage sleds 115a-n, thus providing efficiency improvements and supporting greater computational loads.

Chassis 100 may be installed within a rack structure that provides all or part of the cooling utilized by chassis 100. For airflow cooling, a rack may include one or more banks of cooling fans that may be operated to ventilate heated air from within the chassis 100 that is housed within the rack. The chassis 100 may alternatively or additionally include one or more cooling fans 130 that may be similarly operated to ventilate heated air from within the sleds 105a-n, 115a-n installed within the chassis. A rack and a chassis 100 installed within the rack may utilize various configurations and combinations of cooling fans to cool the sleds 105a-n, 115a-n and other components housed within chassis 100.

The sleds 105a-n, 115a-n may be individually coupled to chassis 100 via connectors that correspond to the bays provided by the chassis 100 and that physically and electrically couple an individual sled to a backplane 160. Chassis backplane 160 may be a printed circuit board that includes electrical traces and connectors that are configured to route signals between the various components of chassis 100 that are connected to the backplane 160. In various embodiments, backplane 160 may include various additional components, such as cables, wires, midplanes, backplanes, connectors, expansion slots, and multiplexers. In certain embodiments, backplane 160 may be a motherboard that includes various electronic components installed thereon. Such components installed on a motherboard backplane 160 may include components that implement all or part of the functions described with regard to the SAS (Serial Attached SCSI) expander 150, I/O controllers 145, network controller 140 and power supply unit 135. In some embodiments, a backplane 160 may be uniquely identified based on a code or other identifier that may be permanently encoded in a non-volatile memory of the backplane 160 by its manufacturer. As described below, embodiments may support validation of backplane 160 as being the same backplane that was installed at the factory during the manufacture of chassis 100. In scenarios where backplane 160 is replaced, embodiments support validation that a replacement backplane installed by a customer in chassis 100 is the same backplane that was supplied to the customer.

Figure 2:
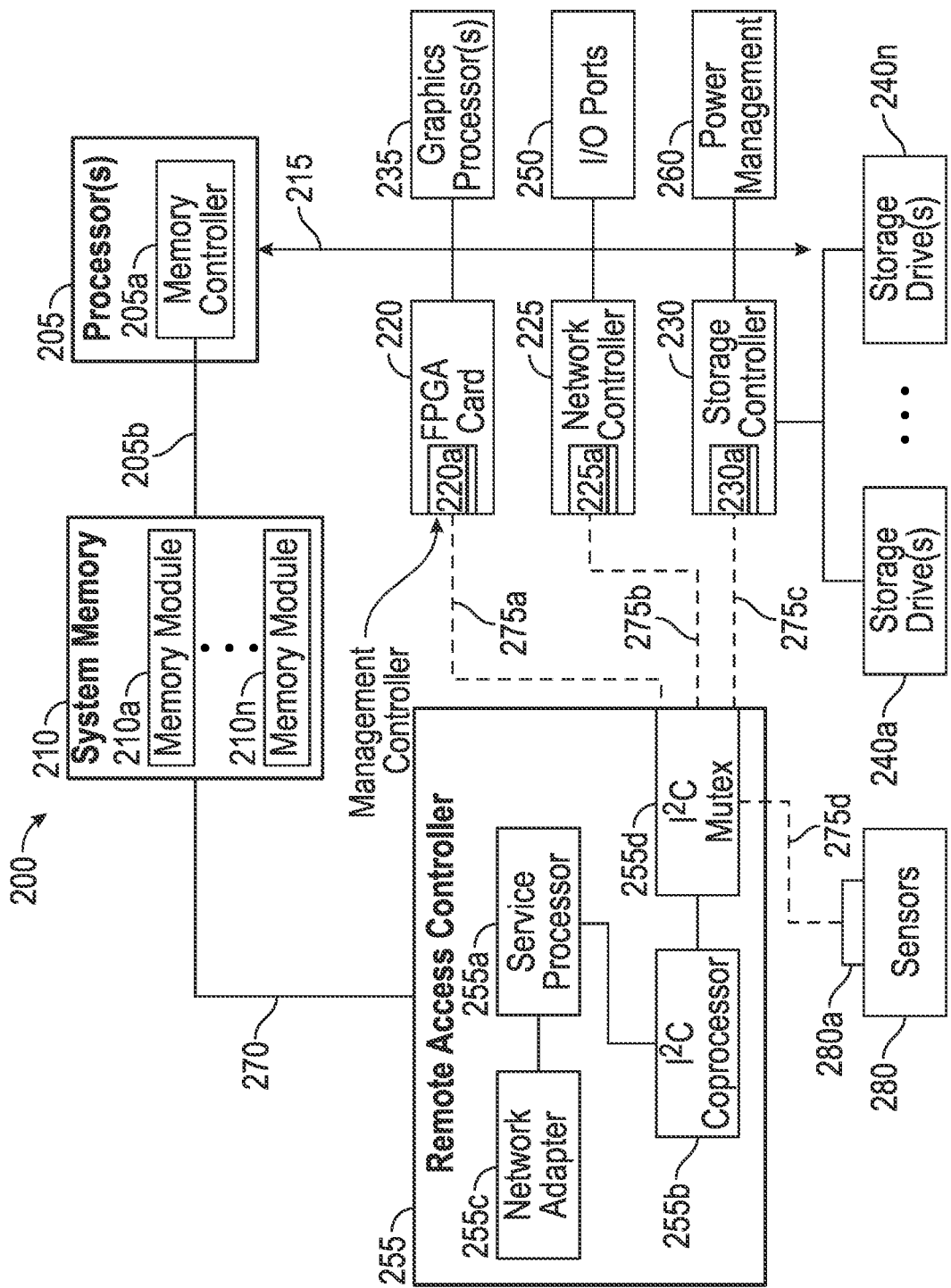
FIG. 2 is a diagram illustrating certain components of an IHS configured as a component of a chassis, according to some embodiments, for supporting validation of secure modifications to the components of the IHS.

In certain embodiments, a compute sled 105a-n may be an IHS such as described with regard to IHS 200 of FIG. 2. A compute sled 105a-n may provide computational processing resources that may be used to support a variety of e-commerce, multimedia, business and scientific computing applications, such as services provided via a cloud implementation. Compute sleds 105a-n are typically configured with hardware and software that provide leading-edge computational capabilities. Accordingly, services provided using such computing capabilities are typically provided as high-availability systems that operate with minimum downtime. As described in additional detail with regard to FIG. 2, compute sleds 105a-n may be configured for general-purpose computing or may be optimized for specific computing tasks.

As illustrated, each compute sled 105a-n includes a remote access controller (RAC) 110a-n. As described in additional detail with regard to FIG. 2, remote access controller 110a-n provides capabilities for remote monitoring and management of compute sled 105a-n. In support of these monitoring and management functions, remote access controllers 110a-n may utilize both in-band and sideband (i.e., out-of-band) communications with various components of a compute sled 105a-n and chassis 100. Remote access controllers 110a-n may collect various types of sensor data, such as collecting temperature sensor readings that are used in support of airflow cooling of the chassis 100 and the sleds 105a-n, 115a-n. In addition, each remote access controller 110a-n may implement various monitoring and administrative functions related to compute sleds 105a-n that utilize sideband bus connections with various internal components of the respective compute sleds 105a-n.

In some embodiments, each compute sled 105a-n installed in chassis 100 may be uniquely identified based on a code or other identifier that may be permanently encoded in a non-volatile memory of a respective compute sled 105a-n by its manufacturer. As described below, embodiments support validation of each compute sled 105a-n as being a compute sled that was installed at the factory during the manufacture of chassis 100. Also as described below, during a provisioning phase of the factory assembly of chassis 100, a signed certificate that specifies hardware components of chassis 100 that were installed during its manufacture may be stored in a non-volatile memory accessed by a remote access controller 110a-n of a compute sled 105a-n. Using this signed inventory certificate, a customer may validate that the hardware components of chassis 100 are the same components that were installed at the factory during its manufacture. In scenarios where hardware components of a chassis are replaced or new hardware components are added to the chassis, embodiments support validation that components installed by a customer in chassis 100 are the same components that were supplied to the customer.

Each of the compute sleds 105a-n may include a storage controller 135a-n that may be utilized to access storage drives that are accessible via chassis 100. Some of the individual storage controllers 135a-n may provide support for RAID (Redundant Array of Independent Disks) configurations of logical and physical storage drives, such as storage drives provided by storage sleds 115a-n. In some embodiments, some or all of the individual storage controllers 135a-n may be HBAs (Host Bus Adapters) that provide more limited capabilities in accessing physical storage drives provided via storage sleds 115a-n and/or via SAS expander 150.

In addition to the data storage capabilities provided by storage sleds 115a-n, chassis 100 may provide access to other storage resources that may be installed components of chassis 100 and/or may be installed elsewhere within a rack housing the chassis 100, such as within a storage blade. In certain scenarios, such storage resources 155 may be accessed via a SAS expander 150 that is coupled to the backplane 160 of the chassis 100. The SAS expander 150 may support connections to a number of JBOD (Just a Bunch Of Disks) storage drives 155 that may be configured and managed individually and without implementing data redundancy across the various drives 155. The additional storage resources 155 may also be at various other locations within a datacenter in which chassis 100 is installed. Such additional storage resources 155 may also be remotely located. In some embodiments, a SAS expander 150 and storage drive 155 may be uniquely identified based on a code or other identifier that may be permanently encoded in a non-volatile memory of the SAS expander 150 or storage drive 155 by its respective manufacturer. In instances where SAS expander 150 and storage drives 155 are factory installed, as described below, embodiments may support validation of SAS expander 150 and storage drives 155 as being the same SAS expander and storage drives that were installed at the factory during the manufacture of chassis 100. In scenarios where SAS expander 150 or a storage drive 155 is replaced or a new SAS expander or storage drive is added to the chassis, embodiments support validation that a SAS expander and storage drives installed by a customer in chassis 100 are the same components that were supplied to the customer.

As illustrated, chassis 100 also includes one or more storage sleds 115a-n that are coupled to the backplane 160 and installed within one or more bays of chassis 200 in a similar manner to compute sleds 105a-n. Each of the individual storage sleds 115a-n may include various different numbers and types of storage devices. For instance, storage sleds 115a-n may include SAS (Serial Attached SCSI) magnetic disk drives, SATA (Serial Advanced Technology Attachment) magnetic disk drives, solid-state drives (SSDs) and other types of storage drives in various combinations. The storage sleds 115a-n may be utilized in various storage configurations by the compute sleds 105a-n that are coupled to chassis 100. As illustrated, each storage sled 115a-n includes a remote access controller (RAC) 120a-n provides capabilities for remote monitoring and management of respective storage sleds 115a-n. In some embodiments, each storage sled 115a-n may be uniquely identified based on a code or other identifier that may be permanently encoded in a non-volatile memory of the respective storage sled 115a-n by its manufacturer. As described below, embodiments support validation of each storage sled 115a-n as being a storage sled that was installed at the factory during the manufacture of chassis 100. In scenarios where a storage sled 115a-n is replaced or a new storage sled is being added to the chassis, embodiments support validation that a storage sled installed by a customer in chassis 100 is the same storage sled that was supplied to the customer.

As illustrated, the chassis 100 of FIG. 1 includes a network controller 140 that provides network access to the sleds 105a-n, 115a-n installed within the chassis. Network controller 140 may include various switches, adapters, controllers and couplings used to connect chassis 100 to a network, either directly or via additional networking components and connections provided via a rack in which chassis 100 is installed. In some embodiments, a network controller 140 may be uniquely identified based on a code or other identifier that may be permanently encoded in a non-volatile memory of the network controller 140 by its manufacturer. As described below, embodiments support validation of network controller 140 as being the same network controller that was installed at the factory during the manufacture of chassis 100. In scenarios where network controller 140 is replaced, embodiments support validation that a replacement network controller installed by a customer in chassis 100 is the same network controller that was supplied to the customer.

Chassis 100 may similarly include a power supply unit 135 that provides the components of the chassis with various levels of DC power from an AC power source or from power delivered via a power system provided by a rack within which chassis 100 may be installed. In certain embodiments, power supply unit 135 may be implemented within a sled that may provide chassis 100 with redundant, hot-swappable power supply units. In some embodiments, a power supply unit 135 may be uniquely identified based on a code or other identifier that may be permanently encoded in a non-volatile memory of the power supply unit 135 by its manufacturer. As described below, embodiments support validation of power supply unit 135 as being the same power supply unit that was installed at the factory during the manufacture of chassis 100. In scenarios where power supply unit 135 is replaced or a new power supply unit is added to the chassis, embodiments support validation that a power supply unit installed by a customer in chassis 100 is the same power supply unit that was supplied to the customer.

Chassis 100 may also include various I/O controllers 140 that may support various I/O ports, such as USB ports that may be used to support keyboard and mouse inputs and/or video display capabilities. Such I/O controllers 145 may be utilized by the chassis management controller 125 to support various KVM (Keyboard, Video and Mouse) 125a capabilities that provide administrators with the ability to interface with the chassis 100. In some embodiments, each I/O controller 140 may be uniquely identified based on a code or other identifier that may be permanently encoded in a non-volatile memory of the respective I/O controller 140 by its manufacturer. As described below, embodiments support validation of I/O controllers 140 as being the same I/O controllers that were installed at the factory during the manufacture of chassis 100. In scenarios where an I/O controller 140 is replaced or a new I/O controller is added to a chassis, embodiments support validation that an I/O controller installed by a customer in chassis 100 is the same I/O controller that was supplied to the customer.

The chassis management controller 125 may also include a storage module 125c that provides capabilities for managing and configuring certain aspects of the storage devices of chassis 100, such as the storage devices provided within storage sleds 115a-n and within the JBOD 155. In some embodiments, a chassis management controller 125 may be uniquely identified based on a code or other identifier that may be permanently encoded in a non-volatile memory of the chassis management controller 125 by its manufacturer. As described below, embodiments support validation of chassis management controller 125 as being the same chassis management controller that was installed at the factory during the manufacture of chassis 100. In scenarios where chassis management controller 125 is replaced or a new chassis management controller is added, embodiments support validation that a chassis management controller installed by a customer in chassis 100 is the same chassis management controller that was supplied to the customer.

In addition to providing support for KVM 125a capabilities for administering chassis 100, chassis management controller 125 may support various additional functions for sharing the infrastructure resources of chassis 100. In some scenarios, chassis management controller 125 may implement tools for managing the power 135, network bandwidth 140 and airflow cooling 130 that are available via the chassis 100. As described, the airflow cooling 130 utilized by chassis 100 may include an airflow cooling system that is provided by a rack in which the chassis 100 may be installed and managed by a cooling module 125b of the chassis management controller 125.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. As described, an IHS may also include one or more buses operable to transmit communications between the various hardware components. An example of an IHS is described in more detail below.

FIG. 2 shows an example of an IHS 200 configured to implement systems and methods described herein for supporting validation of secure modifications to the components of IHS 200. It should be appreciated that although the embodiments described herein may describe an IHS that is a compute sled or similar computing component that may be deployed within the bays of a chassis, other embodiments may be utilized with other types of IHSs that may also support validation of the secure assembly and delivery of the IHS 200. In the illustrative embodiment of FIG. 2, IHS 200 may be a computing component, such as compute sled 105a-n or other type of server, such as an 1 RU server installed within a 2 RU chassis, that is configured to share infrastructure resources provided by a chassis 100.

The IHS 200 of FIG. 2 may be a compute sled, such as compute sleds 105a-n of FIG. 1, that may be installed within a chassis, that may in turn be installed within a rack. Installed in this manner, IHS 200 may utilize shared power, network and cooling resources provided by the chassis and/or rack. Embodiments of IHS 200 may include a wide variety of different hardware configurations. Such variations in hardware configuration may result from IHS 200 being factory assembled to include components specified by a customer that has contracted for manufacture and delivery of IHS 200. As described in additional detail below, IHS 200 may include capabilities that allow a customer to validate that the hardware components of IHS 200 are the same hardware components that were installed at the factory during its manufacture. In scenarios where hardware components of IHS 200 are replaced or new hardware components are added to IHS 200, embodiments support validation that hardware components installed by a customer in IHS 200 are the same components that were supplied to the customer.

IHS 200 may utilize one or more processors 205. In some embodiments, processors 205 may include a main processor and a co-processor, each of which may include a plurality of processing cores that, in certain scenarios, may each be used to run an instance of a server process. In certain embodiments, one or all of processor(s) 205 may be graphics processing units (GPUs) in scenarios where IHS 200 has been configured to support functions such as multimedia services and graphics applications. In some embodiments, each of the processors 205 may be uniquely identified based on a code or other identifier that may be permanently encoded in a respective processor 205 by its manufacturer. As described below, embodiments support validation of processors 205 as being the same processors that were installed at the factory during the manufacture of IHS 200. In some instances, the motherboard on which processor 205 is mounted may be replaced. In such scenarios, embodiments support validation that a replacement motherboard installed by a customer in IHS 200 is the same motherboard that was supplied to the customer.

As illustrated, processor(s) 205 includes an integrated memory controller 205a that may be implemented directly within the circuitry of the processor 205, or the memory controller 205a may be a separate integrated circuit that is located on the same die as the processor 205. The memory controller 205a may be configured to manage the transfer of data to and from the system memory 210 of the IHS 205 via a high-speed memory interface 205b. The system memory 210 is coupled to processor(s) 205 via a memory bus 205b that provides the processor(s) 205 with high-speed memory used in the execution of computer program instructions by the processor(s) 205. Accordingly, system memory 210 may include memory components, such as static RAM (SRAM), dynamic RAM (DRAM), NAND Flash memory, suitable for supporting high-speed memory operations by the processor(s) 205. In certain embodiments, system memory 210 may combine both persistent, non-volatile memory and volatile memory.

In certain embodiments, the system memory 210 may be comprised of multiple removable memory modules. The system memory 210 of the illustrated embodiment includes removable memory modules 210a-n. Each of the removable memory modules 210a-n may correspond to a printed circuit board memory socket that receives a removable memory module 210a-n, such as a DIMM (Dual In-line Memory Module), that can be coupled to the socket and then decoupled from the socket as needed, such as to upgrade memory capabilities or to replace faulty memory modules. Other embodiments of IHS system memory 210 may be configured with memory socket interfaces that correspond to different types of removable memory module form factors, such as a Dual In-line Package (DIP) memory, a Single In-line Pin Package (SIPP) memory, a Single In-line Memory Module (SIMM), and/or a Ball Grid Array (BGA) memory. In some embodiments, each of the memory modules 210a-n may be uniquely identified based on a code or other identifier that may be permanently encoded in a respective memory module 210a-n by its manufacturer. As described below, embodiments support validation of memory modules 210a-n as being the same memory modules that were installed at the factory during the manufacture of IHS 200. In scenarios where one or more memory modules 210a-n of IHS 200 are replaced or new memory modules are being added to IHS 200, embodiments support validation that memory modules installed by a customer in IHS 200 are the same memory modules that were supplied to the customer.

IHS 200 may utilize a chipset that may be implemented by integrated circuits that are connected to each processor 205. All or portions of the chipset may be implemented directly within the integrated circuitry of an individual processor 205. The chipset may provide the processor(s) 205 with access to a variety of resources accessible via one or more in-band buses 215. Various embodiments may utilize any number of buses to provide the illustrated pathways served by in-band bus 215. In certain embodiments, in-band bus 215 may include a PCIe (PCI Express) switch fabric that is accessed via a PCIe root complex. IHS 200 may also include one or more I/O ports 250, such as PCIe ports, that may be used to couple the IHS 200 directly to other IHSs, storage resources and/or other peripheral components.

As illustrated, IHS 200 may include one or more FPGA (Field-Programmable Gate Array) cards 220. Each of the FPGA card 220 supported by IHS 200 may include various processing and memory resources, in addition to an FPGA logic unit that may include circuits that can be reconfigured after deployment of IHS 200 through programming functions supported by the FPGA card 220. Through such reprogramming of such logic units, each individual FGPA card 220 may be optimized to perform specific processing tasks, such as specific signal processing, security, data mining, and artificial intelligence functions, and/or to support specific hardware coupled to IHS 200. In some embodiments, a single FPGA card 220 may include multiple FPGA logic units, each of which may be separately programmed to implement different computing operations, such as in computing different operations that are being offloaded from processor 205. The FPGA card 220 may also include a management controller 220a that may support interoperation with the remote access controller 255 via a sideband device management bus 275a. In some embodiments, each of the FPGA cards 220 installed in IHS 200 may be uniquely identified based on a code or other identifier that may be permanently encoded in the FPGA card 220 by its manufacturer. As described below, embodiments support validation of FPGA card 220 as being the same FPGA card that was installed at the factory during the manufacture of IHS 200. In scenarios where an FPGA card 220 of IHS 200 is replaced or a new FPGA card is added to the IHS 200, embodiments support validation that an FPGA card installed by a customer in IHS 200 is the same FPGA card that was supplied to the customer.

Processor(s) 205 may also be coupled to a network controller 225 via in-band bus 215, such as provided by a Network Interface Controller (NIC) that allows the IHS 200 to communicate via an external network, such as the Internet or a LAN. In some embodiments, network controller 225 may be a replaceable expansion card or adapter that is coupled to a motherboard connector of IHS 200. In some embodiments, network controller 225 may be an integrated component of IHS 200. In some embodiments, network controller 225 may be uniquely identified based on a code or other identifier, such as a MAC address, that may be permanently encoded in a non-volatile memory of network controller 225 by its manufacturer. As described below, embodiments support validation of network controller 225 as being the same network controller that was installed at the factory during the manufacture of IHS 200. In scenarios where a network controller 225 of IHS 200 is replaced or a new network controller is added to IHS 200, embodiments support validation that a network controller installed by a customer in IHS 200 is the same network controller that was supplied to the customer.

A variety of additional components may be coupled to processor(s) 205 via in-band bus 215. For instance, processor(s) 205 may also be coupled to a power management unit 260 that may interface with the power system unit 135 of the chassis 100 in which an IHS, such as a compute sled, may be installed. In certain embodiments, a graphics processor 235 may be comprised within one or more video or graphics cards, or an embedded controller, installed as components of the IHS 200. In certain embodiments, graphics processor 235 may be an integrated component of the remote access controller 255 and may be utilized to support the display of diagnostic and administrative interfaces related to IHS 200 via display devices that are coupled, either directly or remotely, to remote access controller 255. In some embodiments, components such as power management unit 260 and graphics processor 235 may also be uniquely identified based on a code or other identifier that may be permanently encoded in a non-volatile memory of these components by their respective manufacturer. As described below, embodiments support validation of these components as being components that were installed at the factory during the manufacture of IHS 200. In scenarios where these components of IHS 200 are replaced or new components are installed in IHS 200, embodiments support validation that components installed by a customer in IHS 200 are the same components that were supplied to the customer.

In certain embodiments, IHS 200 may operate using a BIOS (Basic Input/Output System) that may be stored in a non-volatile memory accessible by the processor(s) 205. The BIOS may provide an abstraction layer by which the operating system of the IHS 200 interfaces with the hardware components of the IHS. Upon powering or restarting IHS 200, processor(s) 205 may utilize BIOS instructions to initialize and test hardware components coupled to the IHS, including both components permanently installed as components of the motherboard of IHS 200 and removable components installed within various expansion slots supported by the IHS 200. The BIOS instructions may also load an operating system for use by the IHS 200. In certain embodiments, IHS 200 may utilize Unified Extensible Firmware Interface (UEFI) in addition to or instead of a BIOS. In certain embodiments, the functions provided by a BIOS may be implemented, in full or in part, by the remote access controller 255. As described in additional detail below, in some embodiments, BIOS may be configured to identify hardware components that are detected as being currently installed in IHS 200. In such instances, the BIOS may support queries that provide the described unique identifiers that have been associated with each of these detected hardware components by their respective manufacturers.

In some embodiments, IHS 200 may include a TPM (Trusted Platform Module) that may include various registers, such as platform configuration registers, and a secure storage, such as an NVRAM (Non-Volatile Random-Access Memory). The TPM may also include a cryptographic processor that supports various cryptographic capabilities. In IHS embodiments that include a TPM, a pre-boot process implemented by the TPM may utilize its cryptographic capabilities to calculate hash values that are based on software and/or firmware instructions utilized by certain core components of IHS, such as the BIOS and boot loader of IHS 200. These calculated hash values may then be compared against reference hash values that were previously stored in a secure non-volatile memory of the IHS, such as during factory provisioning of IHS 200. In this manner, a TPM may establish a root of trust that includes core components of IHS 200 that are validated as operating using instructions that originate from a trusted source.

As described, IHS 200 may include a remote access controller 255 that supports remote management of IHS 200 and of various internal components of IHS 200. In certain embodiments, remote access controller 255 may operate from a different power plane from the processors 205 and other components of IHS 200, thus allowing the remote access controller 255 to operate, and management tasks to proceed, while the processing cores of IHS 200 are powered off. As described, various functions provided by the BIOS, including launching the operating system of the IHS 200, may be implemented by the remote access controller 255. In some embodiments, the remote access controller 255 may perform various functions to verify the integrity of the IHS 200 and its hardware components prior to initialization of the operating system of IHS 200 (i.e., in a bare-metal state). In some embodiments, certain operations of the remote access controller 225, such as the described inventory certificate generation and validation operations, may operate using validated instructions, and thus within the root of trust of IHS 200.

In some embodiments, remote access controller 255 may be uniquely identified based on a code or other identifier that may be permanently encoded in a non-volatile memory of the remote access controller 255 by its manufacturer. As described below, embodiments support validation of remote access controller 255 as being the same controller that was installed at the factory during the manufacture of IHS 200. In scenarios where remote access controller 255 of IHS 200 is replaced, embodiments support validation that a replacement remote access controller installed by a customer in IHS 200 is the same remote access controller that was supplied to the customer. Also as described below, during a provisioning phase of the factory assembly of IHS 200, a signed certificate that specifies factory installed hardware components of IHS 200 that were installed during manufacture of the IHS 200 may be stored in a non-volatile memory that is accessed by remote access controller 255. Using this signed inventory certificate stored by the remote access controller 255, a customer may validate that the detected hardware components of IHS 200 are the same hardware components that were installed at the factory during manufacture of IHS 200. Also as described below, in response to replacement of one or more hardware components of IHS 200 or to the addition of new hardware components to IHS 200, the remote access controller 255 may be configured to receive a new signed inventory certificate or an updated signed inventory certificate that may be used to validate that the hardware components installed by a customer are the same hardware components that were supplied to the customer.

In support of the capabilities for validating the detected hardware components of IHS 200 against the inventory information that is specified in a signed inventory certificate, remote access controller 255 may support various cryptographic capabilities. For instance, remote access controller 255 may include capabilities for key generation such that remote access controller may generate keypairs that include a public key and a corresponding private key. As described in additional detail below, using generated keypairs, remote access controller 255 may digitally sign inventory information collected during the factory assembly of IHS 200 such that the integrity of this signed inventory information may be validated at a later time using the public key by a customer that has purchased IHS 200. Using these cryptographic capabilities of the remote access controller, the factory installed inventory information that is included in an inventory certificate may be anchored to a specific remote access controller 255, since the keypair used to sign the inventory information is signed using the private key that is generated and maintained by the remote access controller 255.

In some embodiment, the cryptographic capabilities of remote access controller 255 may also include safeguards for encrypting any private keys that are generated by the remote access controller and further anchoring them to components within the root of trust of IHS 200. For instance, a remote access controller 255 may include capabilities for accessing hardware root key (HRK) capabilities of IHS 200, such as for encrypting the private key of the keypair generated by the remote access controller. In some embodiments, the HRK may include a root key that is programmed into a fuse bank, or other immutable memory such as one-time programmable registers, during factory provisioning of IHS 200. The root key may be provided by a factory certificate authority, such as described below. By encrypting a private key using the hardware root key of IHS 200, the hardware inventory information that is signed using this private key is further anchored to the root of trust of IHS 200. If a root of trust cannot be established through validation of the remote access controller cryptographic functions that are used to access the hardware root key, the private key used to sign inventory information cannot be retrieved. In some embodiments, the private key that is encrypted by the remote access controller using the HRK may be stored to a replay protected memory block (RPMB) that is accessed using security protocols that require all commands accessing the RPMB to be digitally signed using a symmetric key and that include a nonce or other such value that prevents use of commands in replay attacks. Stored to an RPMG, the encrypted private key can only be retrieved by a component within the root of trust of IHS 200, such as the remote access controller 255.

Remote access controller 255 may include a service processor 255a, or specialized microcontroller, that operates management software that supports remote monitoring and administration of IHS 200. Remote access controller 255 may be installed on the motherboard of IHS 200 or may be coupled to IHS 200 via an expansion slot provided by the motherboard. In support of remote monitoring functions, network adapter 225c may support connections with remote access controller 255 using wired and/or wireless network connections via a variety of network technologies. As a non-limiting example of a remote access controller, the integrated Dell Remote Access Controller (iDRAC) from Dell® is embedded within Dell PowerEdge™ servers and provides functionality that helps information technology (IT) administrators deploy, update, monitor, and maintain servers remotely.

In some embodiments, remote access controller 255 may support monitoring and administration of various managed devices 220, 225, 230, 280 of an IHS via a sideband bus interface. For instance, messages utilized in device management may be transmitted using I2C sideband bus connections 275a-d that may be individually established with each of the respective managed devices 220, 225, 230, 280 through the operation of an I2C multiplexer 255d of the remote access controller. As illustrated, certain of the managed devices of IHS 200, such as non-standard hardware 220, network controller 225 and storage controller 230, are coupled to the IHS processor(s) 205 via an in-line bus 215, such as a PCIe root complex, that is separate from the I2C sideband bus connections 275a-d used for device management. The management functions of the remote access controller 255 may utilize information collected by various managed sensors 280 located within the IHS. For instance, temperature data collected by sensors 280 may be utilized by the remote access controller 255 in support of closed-loop airflow cooling of the IHS 200.

In certain embodiments, the service processor 255a of remote access controller 255 may rely on an I2C co-processor 255b to implement sideband I2C communications between the remote access controller 255 and managed components 220, 225, 230, 280 of the IHS. The I2C co-processor 255b may be a specialized co-processor or microcontroller that is configured to interface via a sideband I2C bus interface with the managed hardware components 220, 225, 230, 280 of IHS. In some embodiments, the I2C co-processor 255b may be an integrated component of the service processor 255a, such as a peripheral system-on-chip feature that may be provided by the service processor 255a. Each I2C bus 275a-d is illustrated as single line in FIG. 2. However, each I2C bus 275a-d may be comprised of a clock line and data line that couple the remote access controller 255 to I2C endpoints 220a, 225a, 230a, 280a which may be referred to as modular field replaceable units (FRUs).

As illustrated, the I2C co-processor 255b may interface with the individual managed devices 220, 225, 230, 280 via individual sideband I2C buses 275*a-d* selected through the operation of an I2C multiplexer 255*d*. Via switching operations by the I2C multiplexer 255*d*, a sideband bus connection 275*a-d* may be established by a direct coupling between the I2C co-processor 255*b* and an individual managed device 220, 225, 230, 280. In providing sideband management capabilities, the I2C co-processor 255*b* may each interoperate with corresponding endpoint I2C controllers 220*a*, 225*a*, 230*a*, 280*a* that implement the I2C communications of the respective managed devices 220, 225, 230. The endpoint I2C controllers 220*a*, 225*a*, 230*a*, 280*a* may be implemented as a dedicated microcontroller for communicating sideband I2C messages with the remote access controller 255, or endpoint I2C controllers 220*a*, 225*a*, 230*a*, 280*a* may be integrated SoC functions of a processor of the respective managed device endpoints 220, 225, 230, 280.

In various embodiments, an IHS 200 does not include each of the components shown in FIG. 2. In various embodiments, an IHS 200 may include various additional components in addition to those that are shown in FIG. 2. Furthermore, some components that are represented as separate components in FIG. 2 may in certain embodiments instead be integrated with other components. For example, in certain embodiments, all or a portion of the functionality provided by the illustrated components may instead be provided by components integrated into the one or more processor(s) 205 as a systems-on-a-chip.

Figure 3:
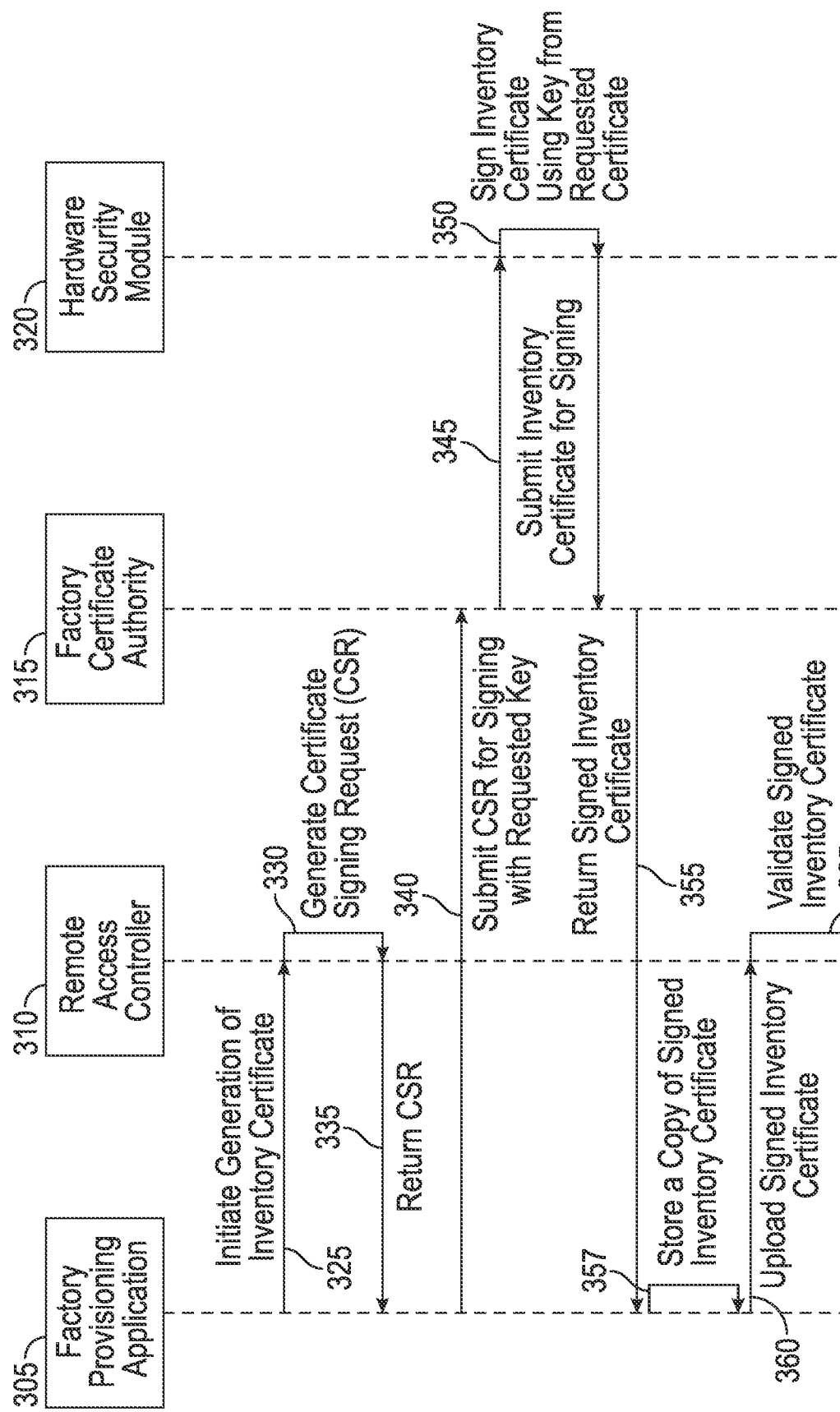
FIG. 3 is a swim lane diagram illustrating certain responsibilities of components of a system configured according to certain embodiments for factory provisioning of an IHS in a manner that supports validation of the hardware components of the IHS and of secure modifications to the IHS.
Figure 4:
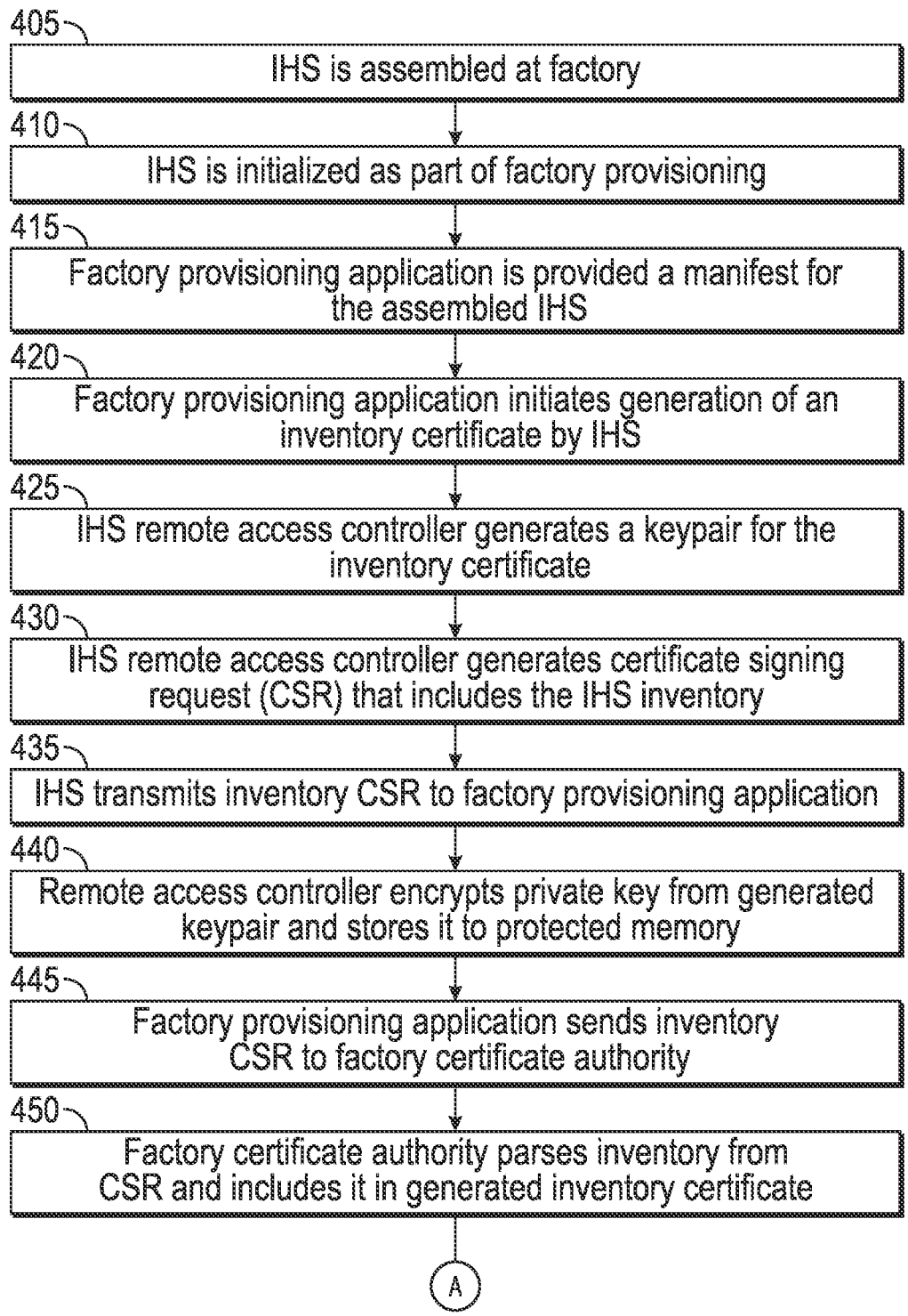
FIG. 4 is a flowchart describing certain steps of a method, according to some embodiments, for assembly and provisioning of an IHS in a manner that supports validation of the hardware components of the IHS and of secure modifications to the IHS.
Figure 4:
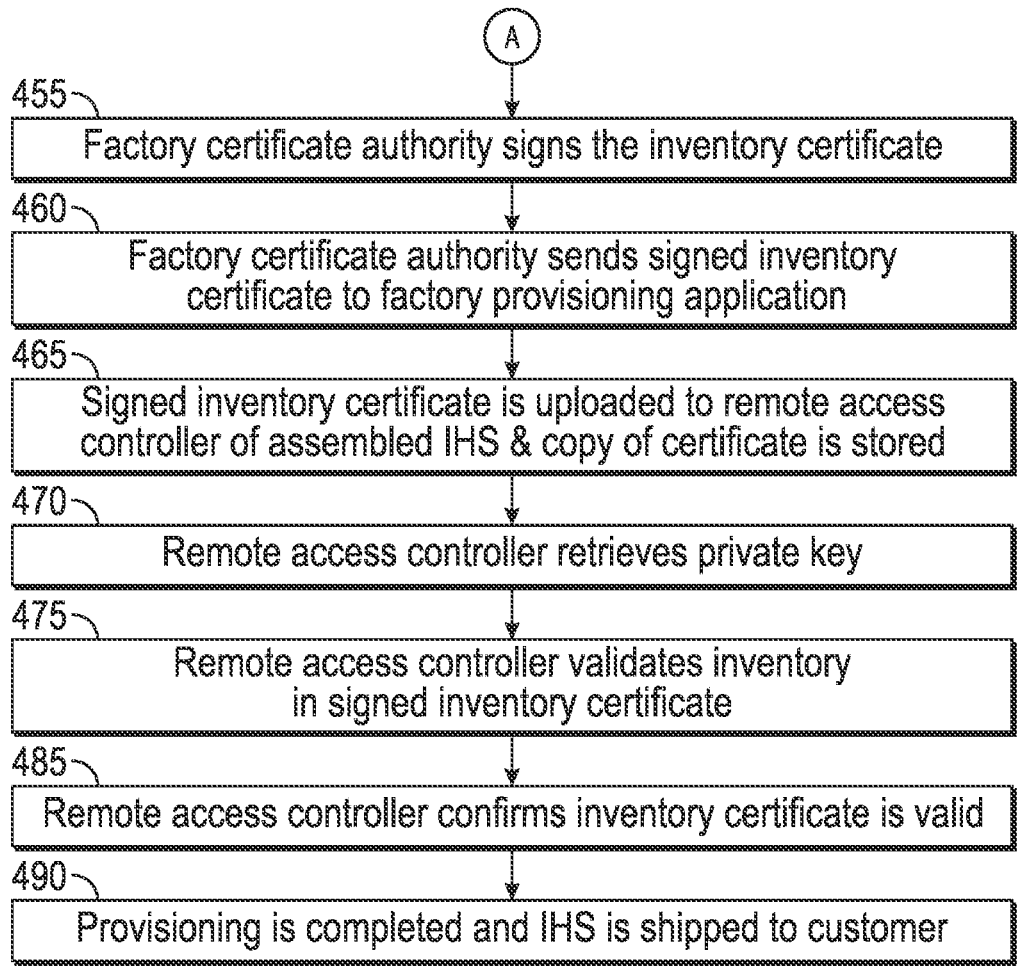

FIG. 3 is a swim lane diagram illustrating certain responsibilities of components of a system configured according to certain embodiments for factory provisioning of an IHS in a manner that supports validation of the hardware components of the IHS and of secure modifications to the IHS. FIG. 4 is a flowchart describing certain steps of a method, according to some embodiments, for assembly and provisioning of an IHS in a manner that supports the validation of the hardware components of the IHS and of secure modifications to the IHS. Some embodiments of the method of FIG. 4 may begin, at block 405, with the factory assembly of an IHS, such as the assembly of a server described with regard to FIGS. 1 and 2. In some instances, an IHS may be manufactured using a factory process that includes multiple phases of assembly, validation and provisioning that must be completed before the IHS is supplied to a customer. As described, an IHS such as a server may be purpose-built for a particular customer such that the server is assembled and provisioned according to specifications provided by the customer. The initial factory assembly of such server IHSs may include the selection of a chassis and the fastening of various hardware components to the selected chassis. Such a factory assembly process may include generating a manifest that tracks the individual hardware components that are installed in an IHS. As described above, the installed hardware components may include standard components and may also include specialized components that have been requested by a specific customer that has contracted for the assembly and delivery of an IHS.

Once the assembly of an IHS has been completed, the IHS may be subjected to manual and automated inspections that confirm the IHS has been properly assembled and does not include any defects. After confirming an IHS has been assembled without any manufacturing defects, at block 410, factory provisioning of the IHS may be initiated. In some instances, the provisioning of an IHS at the factory may include various stages that may include stages for loading of firmware, configuring hardware components, and installing an operating system and other software. As indicated in FIG. 3, various aspects of this factory provisioning process may be conducted using a factory provisioning application, where this factory provisioning application may run on one or more servers and may interface with an IHS that is being provisioned once a requisite amount of firmware and software has been installed to the IHS.

As described, a manifest of the individual hardware components that are installed in an IHS may be generated during assembly of the IHS. Such a manifest may be a file that includes an entry for each component installed to an IHS, where the entry may specify various characteristics of the component, such as model numbers and installation locations, and may also specify any unique identifiers associated with the component, such as a MAC address or a serial number. At block 415, a manifest generated during assembly of an IHS is provided to the factory provisioning application that is being used to provision the assembled IHS. Based on this hardware manifest information, at block 420, the factory provisioning application may also initiate the generation of an inventory certificate that may be used to validate that the detected hardware components of the IHS are the same hardware components that were installed during the factory assembly of the IHS. As described in additional detail with regard to FIG. 7, once an IHS has been shipped to a customer, replacement hardware or new hardware may be installed to an IHS. In response to such modifications, the inventory certificate generated during factory provisioning of an IHS may be replaced or updated by a remote validation service. Such replacement or updated inventory certificates may then be utilized by a customer to confirm that the hardware installed by the customer is the same hardware components supplied to the customer.

As described with regard to FIGS. 1 and 2, an IHS may include a remote access controller that provides capabilities for remote management of an IHS, where these remote management capabilities may include sideband management of various hardware components of an IHS. As indicated in FIG. 3, the generation of an inventory certificate for a newly assembled IHS, at 325, may be initiated via a request from the factory provisioning application 305 to the remote access controller 310 of the IHS. As described with regard to FIG. 2, a remote access controller of an IHS may include cryptographic capabilities that operate within the root of trust of the IHS and that include the ability to generate cryptographic keypairs. Utilizing such cryptographic capabilities, at block 425, the remote access controller 310 initiates the generation of an inventory certificate by generating a cryptographic key pair for use in validating the authenticity of inventory information that is included in an inventory certificate.

At block 430 and at 330, the remote access controller 310 generates a certificate signing request (CSR) for a digital identity certificate, where the request specifies the public key of the key pair generated by the remote access controller and also specifies the factory installed hardware inventory from the manifest that was generated during assembly of the IHS. The factory installed hardware inventory information included in the CSR may be signed by the remote access controller using the private key from the generated keypair. At block 435 and at 335, the CSR for the requested inventory certificate is transmitted to the factory provisioning application 305 by the remote access controller 310. At block 440, the remote access controller safeguards the private key from the generated key pair. In some embodiments, the remote access controller may encrypt the private key using the hardware root key (HRK) of the IHS and may store the encrypted key to a protected memory, such as the replay protected memory block that is described with regard to FIG. 2.

Upon receiving the certificate signing request from the remote access controller 310, at block 445 and at 340, the factory provisioning application 305 submits the CSR for signing by a factory certificate authority 315. In some embodiments, the factory provisioning application 305 specifies a factory key to be used by the factory certificate authority 315 in signing the inventory certificate. For instance, the factory provisioning application may include the name of a trusted certificate associated with a factory key as an attribute of the CSR that is transmitted to the factory certificate authority 315. Upon receipt of the CSR, at block 450, the factory certificate authority parses from the CSR: the hardware inventory information, the public key generated by the remote access controller and the information specifying the requested signing key. Based on the information parsed from the CSR, the factory certificate authority generates a digital identity certificate, referred to herein as an inventory certificate, that is associated with the public key provided by the remote access controller and that specifies the factory installed hardware inventory of the IHS. As described below, at a later time, this inventory certificate may be updated or replaced in response to replacement of one or more hardware components of the IHS or in response to additional hardware components being installed in the IHS.

As indicated in FIG. 3, at 345, the factory certificate authority 315 submits the generated inventory certificate for signing by a hardware security module 320 that may be a dedicated hardware component of a factory provisioning server that safeguards cryptographic keys and implements cryptographic functions utilized in the factory provisioning process. In some embodiments, the factory certificate authority 315 may also specify a certificate name associated with a signing key that is maintained by the hardware security module 320. At 350, the hardware security module 320 utilizes the private key associated with the specified certificate in order to digitally sign the submitted inventory certificate, which includes the inventory of the factory installed hardware components of the IHS. The signed inventory certificate is then returned to the factory certificate authority 315 by the hardware security module 320.

Once the inventory certificate has been signed, at block 460 and at 355, the signed inventory certificate is transmitted from the factory certificate authority 315 to the factory provisioning application 305. As indicated in FIG. 3 at 357, the factory provisioning application 305 may store a copy of the signed inventory certificate. In some instances, the copy may be saved to a data store utilized in providing ongoing support of the IHS once it has been shipped and has been deployed by a customer. As described below with regard to FIG. 7, using this stored copy of the signed inventory certificate, a trusted entity providing ongoing support of IHS may validate that an inventory of installed hardware reported by the IHS matches the factory installed hardware of the IHS. In addition, the trusted entity may utilize the stored inventory certificate to provide the IHS with a new or updated inventory certificate that reflects replacement and/or new hardware that was supplied for installation in the IHS. Using the inventory certificate that includes updated inventory information, an administrator may confirm that a hardware modification was made using a genuine component that was supplied by a trusted entity.

At block 465 and at 360, the signed inventory certificate is than loaded to the assembled IHS. As indicated in FIG. 3, in some embodiments, the signed inventory certificate may be uploaded to a remote access controller 310 of the assembled IHS, such that the signed inventory certificate may be stored to a nonvolatile memory or other persistent storage that is accessible by the remote access controller 310 independent from the operating system of the IHS. In other embodiments, the signed inventory certificate may be uploaded without reliance on the remote access controller to another non-volatile memory of the IHS.

Some embodiments may continue, at 365, with the validation of the signed inventory certificate by the remote access controller 310. Using the public key from the generated keypair, at block 475, the remote access controller decrypts the signature included by the remote access controller in the CSR and confirms that the inventory information included in the signed inventory certificate matches the inventory information that was submitted in the certificate signing request, thus validating the integrity of the generation of the signed inventory certificate. At block 485, the remote access controller confirms that the inventory included in the signed inventory certificate is valid and, at 370, the remote access controller 310 confirms the validity of the inventory certificate with a notification to the factory provisioning application 305. With the generation and validation of the signed inventory certificate completed, additional factory provisioning of the assembled IHS may be completed and, at block 490, the assembled IHS may be shipped from the factory to a customer.

Upon delivery of the IHS, embodiments provide a customer with the capability of validating that the delivered IHS includes only hardware components that were installed at the factory during manufacture of the IHS. Embodiments thus support an initial validation of the secure assembly and delivery of an IHS. However, once an IHS has been deployed, various components of the IHS may be replaced and new components may be installed to the IHS. Accordingly, upon modification of the components of an IHS, embodiments also provide a customer with the capability of validating that the hardware installed in the IHS at a later time is the same hardware that was supplied to the customer by a trusted entity.

Figure 5:
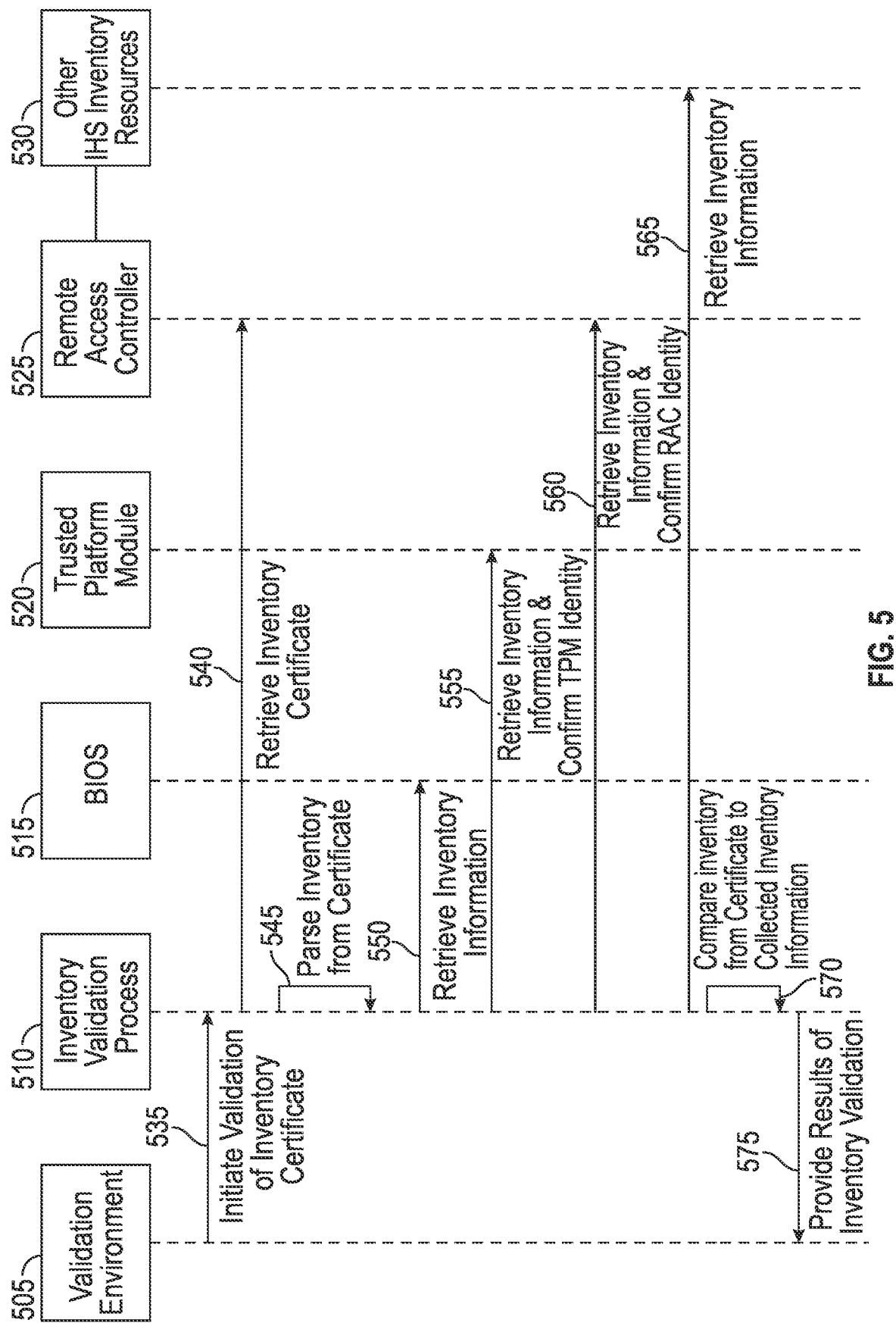
FIG. 5 is a swim lane diagram illustrating certain responsibilities of components of an IHS configured according to certain embodiments for validation of secure modifications to the IHS.
Figure 6:
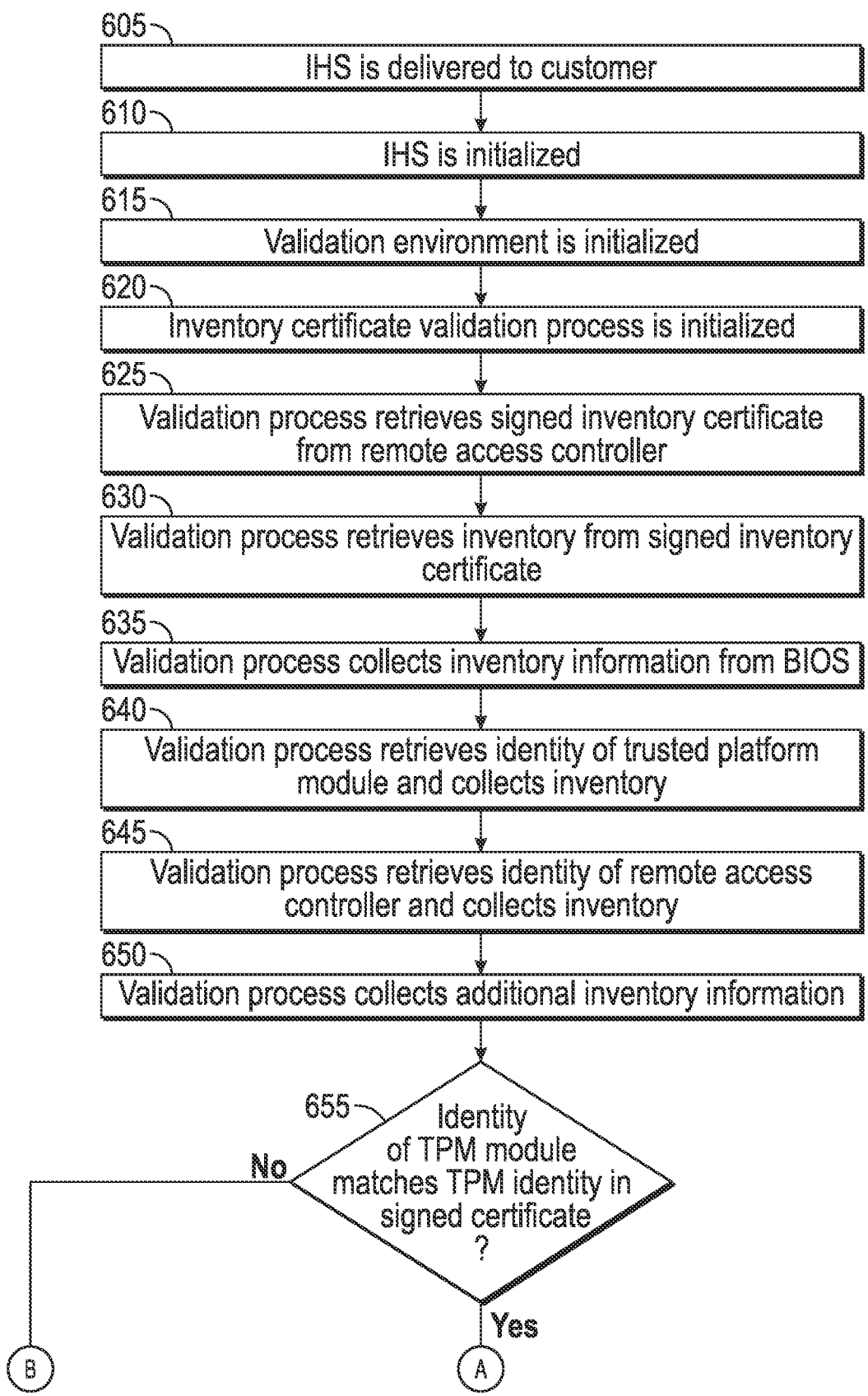
FIG. 6 is a flowchart describing certain steps of an additional method, according to some embodiments, for supporting the validation of secure modifications to an IHS.
Figure 6:
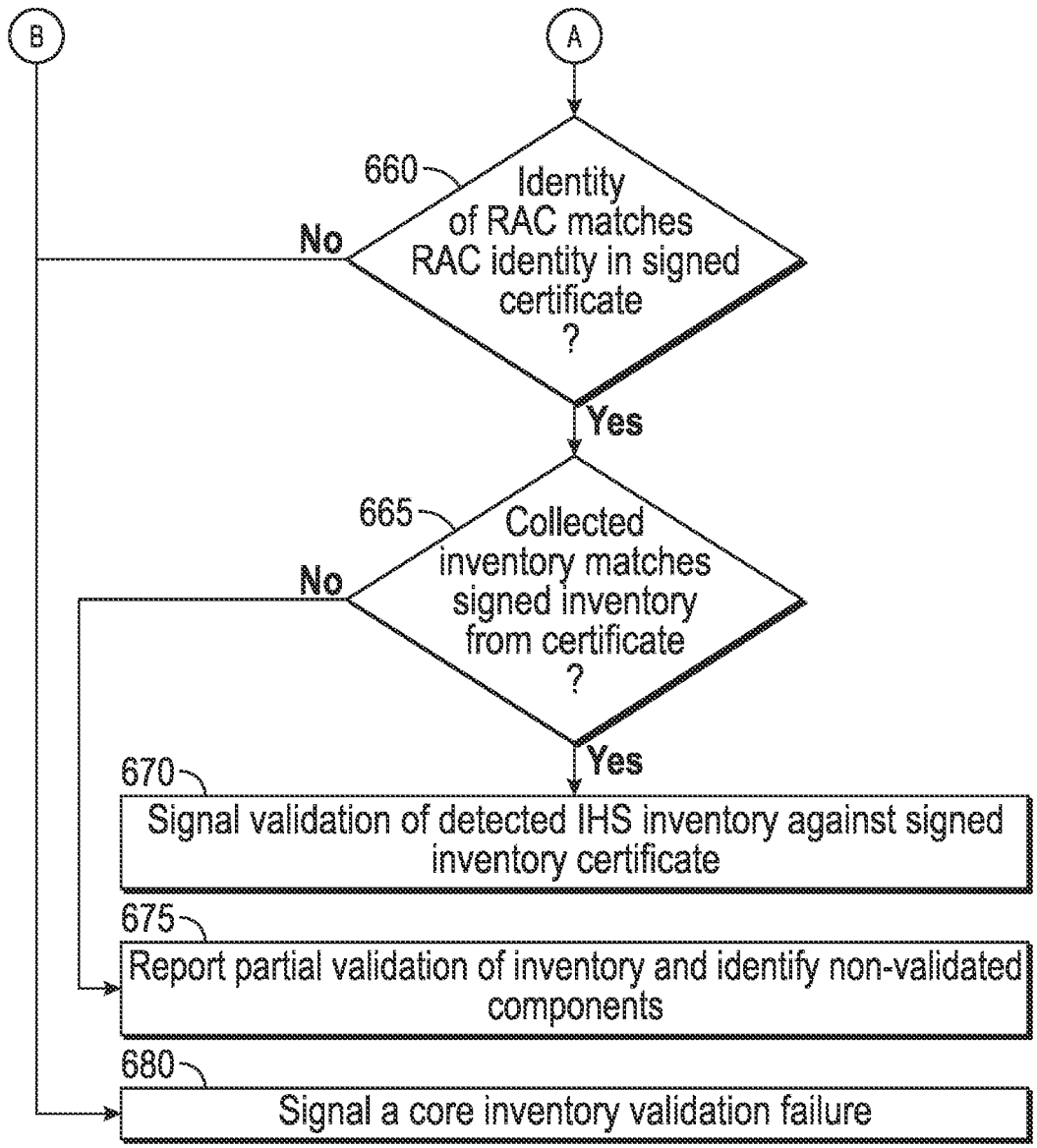

FIGS. 5 and 6 describe embodiments for use of an inventory certificate in the validation of an IHS as including only genuine hardware components, where the inventory certificate may be an original inventory certificate generated during factory provisioning of the IHS, or may be an updated/new inventory certificate that has been generated by a remote validation service in response to modifications to the hardware components of an IHS. Further below, FIG. 7 describes the generation of new and updated inventory certificate by a remote validation service in response to modifications to the hardware components of an IHS. Accordingly, FIG. 5 is a swim lane diagram illustrating certain responsibilities of components of an IHS configured according to certain embodiments for use of an inventory certificate in the validation of the hardware components of the IHS. FIG. 6 is a flowchart describing certain steps of a method, according to some embodiments, for use of an inventory certificate in the validation of the hardware components of the IHS. Embodiments may begin, at block 605, with the delivery of an IHS to a customer, where the IHS has been assembled and provisioned according to the procedures set forth above. In particular, the delivered IHS has been provisioned at the factory to include a signed inventory certificate that specifies the factory installed hardware components of the IHS.

Upon receiving an IHS configured in this manner, at block 610, the IHS may be unpacked, assembled and initialized by an administrator. In some instances, an IHS may be ready for immediate deployment by a customer. In other instances, an IHS may require further provisioning by customer before it is deployed, such as for operation within a particular data center. As such, in various instances, an IHS may be unpacked, assembled and initialized in order to deploy the IHS or to prepare it for further provisioning. At block 615, the IHS has been powered and validation process is initialized. In some instances, the validation process may be initialized as part of the initial provisioning of an IHS by a customer. In other instances, the validation process may be initialized upon the customer installing new and/or replacement hardware components in the IHS. In some embodiments, the validation process may run within a pre-boot environment, such as a PXE (Preboot eXecution Environment) operating environment. In some embodiments, a PXE operating environment in which a validation process runs may be retrieved from a network location and may thus be executed using the processing and memory capabilities of the IHS. In some embodiments, a PXE operating environment may be retrieved using secure protocols, such as HTTPS, in order to assure the integrity of the operating environment instructions that are utilized. In some embodiments, a pre-boot operating environment in which the validation process runs may include an operating environment that is executed by the remote access controller of the IHS based on validated firmware instructions. In these embodiments that utilize a pre-boot operating environment, the validation of the detected hardware components of the IHS is conducted prior to booting of the operating system of the IHS.

In some embodiments, the validation process may run as part of a diagnostic mode that is supported by an IHS. For instance, an IHS may support a diagnostic mode that may be initiated by a user or may be initiated automatically in response to detecting various conditions, where the diagnostic mode may support various diagnostic tools, including the described hardware validation procedures. In some embodiments, the diagnostic mode may involve re-booting the IHS to a diagnostic environment, while other embodiments may support diagnostic mode operations that run within the operating system of the IHS. Accordingly, some embodiments may support the described hardware validation procedures as a feature available within the operating system of the IHS. In such embodiments, the operating system may be configured to periodically conduct the described hardware validation procedures, such as on a daily or weekly basis. The operating system may likewise be configured to conduct the hardware validation procedures in response to a detected security notification, such as a notification that a process is attempting to access a protected resource. In some embodiments, the described validation procedures may be implemented remotely, such as via the described HTTPS protocols, where the remote validation procedures may rely both on information retrieved from the IHS via HTTPS and on remote information, such as information maintained by the manufacturer of the IHS or by an entity supporting the administration of the IHS.

At block 620 and as indicated at 535 of FIG. 5, an inventory certificate validation process 510 is initiated within a validation environment 505 that may include a pre-boot environment, a diagnostic environment or other environment supporting the validation process. In some embodiments, the inventory certificate validation process 510 operates based on validated instructions, such as based on instructions that, when used to calculate a hash value, are confirmed to correspond to a value stored in an immutable memory of the IHS during its factory provisioning. In this manner, the inventory certificate validation process may be added to the root of trust of the IHS. At block 625 and as indicated at 540, the inventory certificate validation process 510 retrieves the signed inventory certificate from the remote access controller 525 or from a persistent memory of the IHS. As described above, the factory provisioning process may include uploading the signed inventory certificate to the remote access controller or to a persistent memory of the IHS. As described in FIG. 7, in response to modifications to the hardware components of an IHS, an updated or a new signed inventory certificate may be provided by a remove validation service and may be uploaded to a persistent memory of the IHS, in some cases via a remote access controller of the IHS. At block 630 and as indicated at 545, the inventory certificate validation process 510 parses the hardware inventory information from the signed inventory certificate. Using the public key provided in the signed inventory certificate, the inventory validation process 510 may confirm the integrity of the inventory information that is included in the signed inventory certificate.

In some scenarios, the inventory certificate validation process 510 may commence by collecting an inventory of the detected hardware components of the IHS. In some instances, this collection of inventory information may be initiated earlier by the inventory certificate validation process, such as during initialization of the IHS. At block 635 and as indicated at 550, the inventory certificate validation process 510 may query the BIOS 515 of the IHS for an inventory of hardware components that have been detected by BIOS 515. At block 640 and as indicated at 555, the inventory certificate validation process 510 may retrieve additional hardware inventory information from a Trusted Platform Module (TPM) 520 of the IHS. In some instances, the TPM 520 may identify hardware components that are also identified by BIOS 515. However, in some instances, the TPM 520 may identify certain hardware components, such as secure memory modules, that are not identified by BIOS 515.

As described with regard to FIG. 2, a Trusted Platform Module may serve to establish an initial hardware root of trust in an IHS such that the hardware components within this root of trust operate using validated software instructions. Accordingly, in some embodiments, the inventory certificate validation process 510 may compare identity information for the detected TPM 520 against the TPM identity information that is parsed from the inventory certificate at block 545. In some instances, the detection of any discrepancies between the identity of the TPM specified in the inventory certificate and the identity reported by TPM 520 may result in terminating any further validation procedures.

At block 645 and as indicated at 560, the inventory certificate validation process 510 may retrieve additional hardware inventory information from a remote access controller 525 of the IHS. As with TPM 520, remote access controller 525 may provide redundant identification of some hardware components and may provide exclusive identification of other hardware components, such as internal memories, management controllers or logic units utilized by the remote access controller 525. Also as with TPM 520, in some embodiments, the inventory certificate validation process 510 may compare identity information for the detected remote access controller 525 against the remote access controller identity information that is parsed from the inventory certificate at block 545. In some instances, the detection of any discrepancies between the identity of the remote access controller specified in inventory certificate and the identity reported by remote access controller 525 may also result in terminating any further validation procedures.

At block 650 and as indicated at 565, the inventory certificate validation process 510 retrieves any additional inventory information from any other data sources, such as directly from the processor of the IHS or from a chassis management controller of a chassis in which the IHS has been installed. Upon completion of the collection of the detected hardware components of the initialized IHS, at block 570, the inventory certificate validation process compares the collected inventory information against the inventory information that is parsed from the signed inventory certificate. Accordingly, at block 655, the inventory certificate validation process may confirm the identity of the detected TPM against the identity of the TPM reported in the signed inventory certificate. If the identity of the TPM is successfully validated, validation may continue at block 660. However, if the identity of the TPM is not validated, at block 680, the inventory certificate validation process may signal a core inventory validation failure since any discrepancies between the identity of the factory installed TPM and the TPM that has been detected in the initialized IHS signals a potential compromise in the root of trusted hardware components of the IHS.

At block 660, the inventory certificate validation process may confirm the identity of the detected remote access controller against the identity of the remote access controller reported in the signed inventory certificate. If the remote access controller is successfully validated, validation may continue at block 665. Otherwise, if the identity of the remote access controller is not validated, at block 680, the inventory certificate validation process may signal a core inventory validation failure. As with the TPM, any discrepancies between the identity of the factory installed remote access controller and the remote access controller detected in the initialized IHS signals a potential compromise of the root of trust of the IHS.

At block 665, the inventory certificate validation process continues the comparison of the detected hardware components of the initialized IHS against the identities of the hardware components that are included in the signed inventory certificate. If the unique identifiers of the detected hardware components of the initialized IHS match the identifiers of the factory installed hardware components from the signed inventory certificate, at block 670, the inventory certificate validation process signals a successful validation of the detected hardware of the IHS. The customer receiving delivery of the IHS is thus assured that the IHS is operating using only hardware components that were installed at the factory during manufacture of the IHS, or that were supplied by a trusted entity.

If any discrepancies are detected between the detected hardware components of the initialized IHS and the hardware components reported in the signed inventory certificate, at block 675, a partial validation of the hardware inventory of the IHS may be reported. In some instances, such discrepancies may result from failure to detect hardware components that are specified in the signed inventory certificate. In some instances, such discrepancies may result from mismatched identity information between the detected hardware components and the components listed in the signed inventory certificate, such as discrepancies in the serial numbers or other unique identifiers associated with a hardware component. In other instances, such discrepancies may result from the detection of hardware components that are not present in the signed inventory certificate. In all cases, any such discrepancies may be reported, thus allowing an administrator to investigate further.

Figure 7:
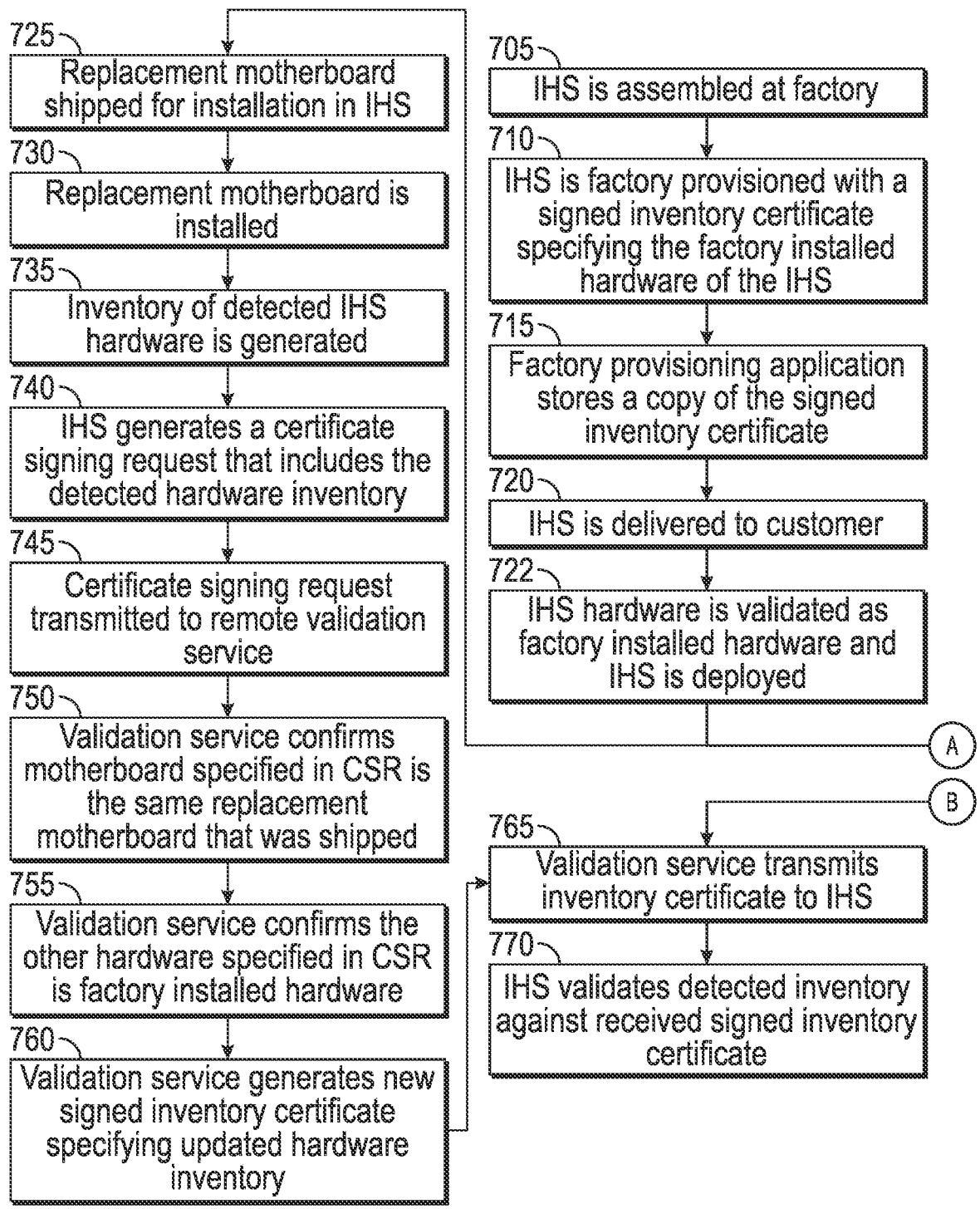
FIG. 7 is a flowchart describing certain steps of an additional method, according to some embodiments, for validating secure modifications to an IHS.
Figure 7:
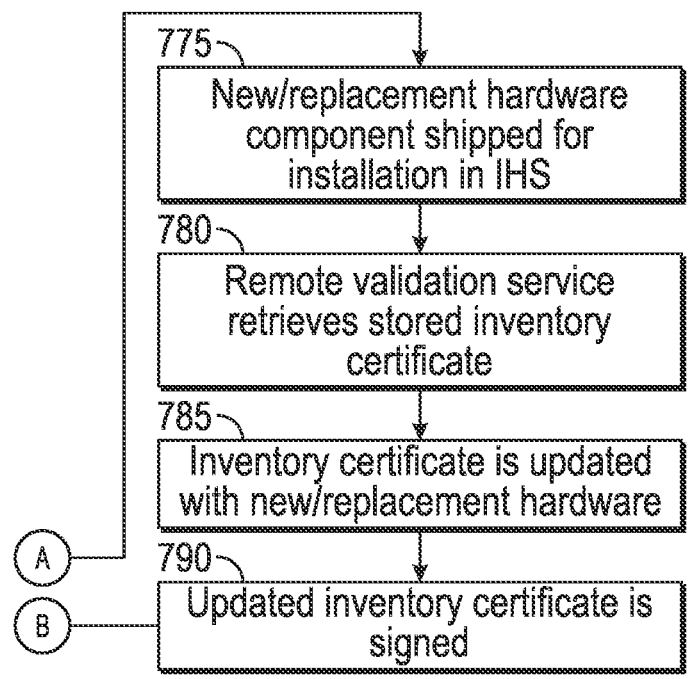
Figure 8:
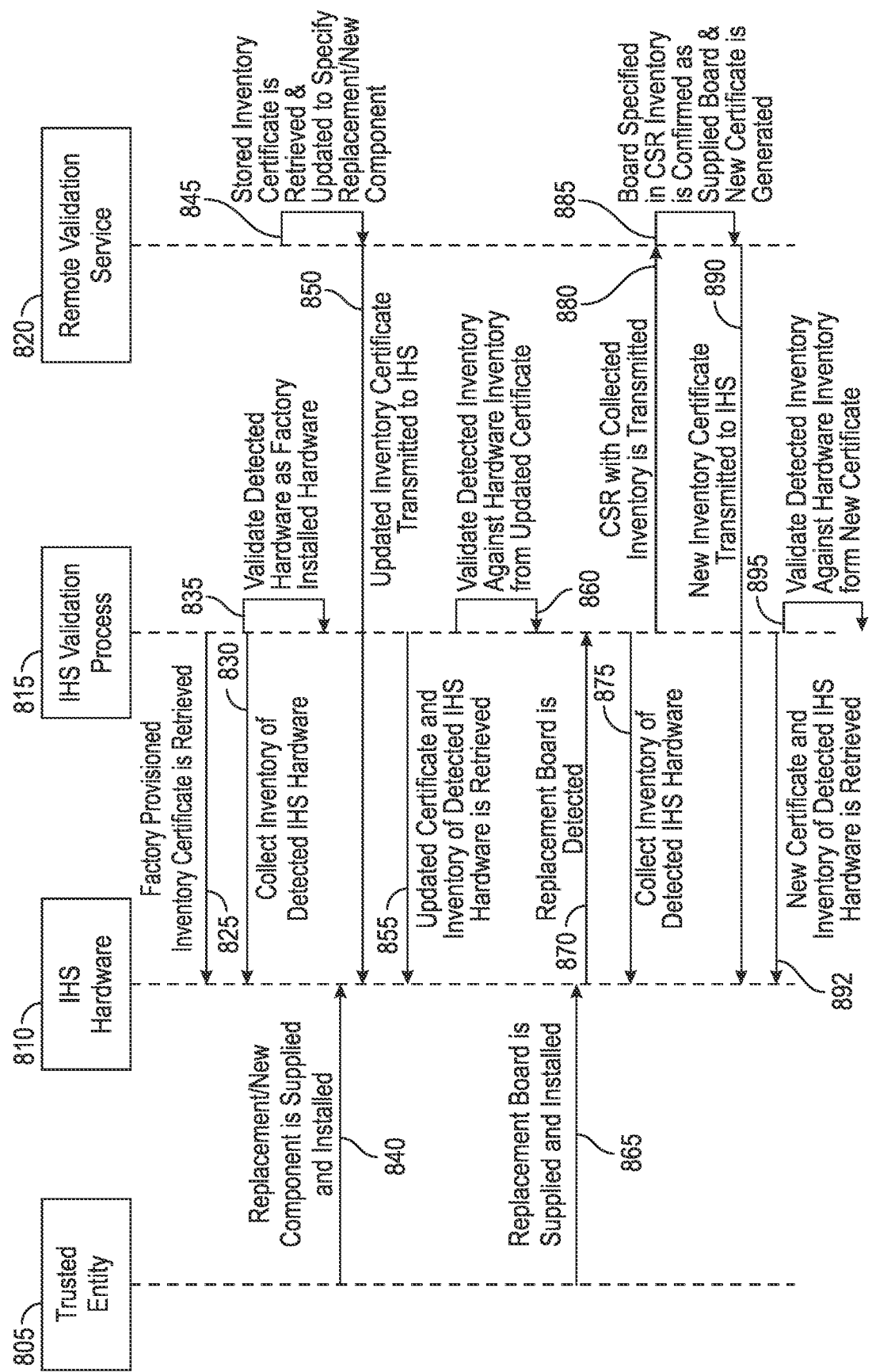
FIG. 8 is a swim lane diagram illustrating certain responsibilities of components of a system configured according to certain embodiments for validation of secure modifications to an IHS.

FIG. 7 is a flowchart describing certain steps of an additional method, according to some embodiments, for validating secure modifications to an IHS, and in particular for generating updated and new inventory certificates in response to modifications to the hardware components of the IHS. FIG. 8 is a swim lane diagram illustrating certain responsibilities of components of a system configured according to certain embodiments for validation of secure modifications to an IHS. Embodiments may begin at block 705 with the factory assembly of an IHS, such as described with regard to FIGS. 3 and 4. Accordingly, the IHS is factory assembled to include various uniquely identifiable hardware components that may each be identified within a manifest that is generated as part of this factory assembly. At block 710, factory provisioning of the IHS generates a signed inventory certificate that specifies the factory installed hardware components of the IHS and is signed by a factory certificate authority, such as described above. Upon generation of the signed inventory certificate, the factory provisioning process may upload the certificate to a persistent memory of the IHS, such as via a remote access controller of the IHS. As described with regard to FIGS. 5 and 6, this inventory certificate may be used by a customer receiving delivery of the IHS to validate that the IHS operates using only factory installed hardware components of the IHS. However, in many scenarios, once a new IHS has been validated and deployed by a customer, over time various modifications may be made to the IHS. For instance, hardware components of the IHS may be replaced due to component failures or to upgrade the capabilities of the IHS. In other instances, additional hardware components may be added to the IHS in order to expand its capabilities.

For use in later validation that such modifications to the hardware components of an IHS are made using genuine hardware components supplied by a trusted entity, at block 715, the factory provisioning application stores a copy of the signed inventory certificate that has been uploaded to the persistent memory of the IHS. Once the factory provisioning of the IHS has been completed, at block 720, the IHS is packaged and shipped to a customer. Upon receiving shipment of the IHS, at block 722 and as described with regard to FIGS. 5 and 6, the customer may validate that the detected hardware components of the IHS include only the factory installed hardware. As indicated in FIG. 8, this validation may include a validation process 815 of the IHS retrieving, at 825, the factory provisioned inventory certificate from its stored location. As described in FIGS. 5 and 6, the validation process 815 then collects, at 830, an inventory of detected hardware components of the IHS based on queries supported by various hardware components 810 of the IHS. Once the IHS has been confirmed, at 835, to be operating using only validated hardware, the IHS may then be deployed. After some time, modifications may be made to the hardware components of the IHS.

Various types of modifications may be made to an IHS. One of such modification is to replace a motherboard or backplane of an IHS to which processors and other core components of the IHS may be fixed. For instance, components such as a remote access controller, a TPM and secure memory devices may be fixed to a motherboard of an IHS. As described above, such core components may be utilized to establish a root of trust that includes hardware components that are operating using validated instructions. Also as described above, embodiments may cryptographically bind a signed inventory certificate to components operating within this root of trust of an IHS. For instance, cryptographic capabilities of a remote access controller and/or a TPM may be used to digitally sign inventory information that is included in an inventory certificate. In scenarios that require replacement of a motherboard, backplane, daughter card or other circuit board of an IHS that includes one or more of such hardware components to which an inventory certificate is digitally bound, an existing inventory certificate that is bound to one of the components cannot be validated by the replacement board that will include different cryptographic components.

In such a scenario, at block 725 and at 865, a replacement motherboard or other circuit board that includes components to which an inventory certificate may be digitally bound is shipped to a customer for installation in an IHS or is sold to a customer via a retail transaction. In various embodiments, the motherboard may be supplied by a trusted entity 805 that may include the manufacturer of the IHS, a retailer that sells replacement parts on behalf of the manufacturer, or by a trusted third party providing ongoing support of the IHS. At block 730, the replacement motherboard is received by the customer and is installed in the IHS. In some embodiments, a replacement motherboard supplied by a trusted entity 805 may be configured to initiate the described validation process upon being booted for the first time, where the replacement mother may be configured through provisioning of the motherboard with boot loading instructions that initiate the validation process 815 that pertains to motherboard validation. At 870, the IHS is booted and the validation process 815 is initiated, where the validation process 815 that is initiated triggers the described procedures for validation of a replacement motherboard. As described with regard to FIGS. 5 and 6, the IHS is initialized and an inventory of the detected hardware components of the IHS is generated by the validation process. Now operating using the replacement motherboard, at 875, the validation process 815 queries the BIOS, remote access controller and/or TPM of this replacement motherboard in order to generate an inventory of detected hardware components that are operating in the IHS.

At block 740, the IHS generates a certificate signing request (CSR) that includes the detected hardware inventory of the IHS. In some embodiments, this CSR may be generated by the remote access controller of the IHS in the same manner as described with regard to the factory provisioning process of FIGS. 4 and 5, where the remote access controller utilizes its cryptographic capabilities to generate a key pair. The public key from this key pair is included in the CSR, thus binding the requested inventory certificate to this remote access controller and consequently to this replacement motherboard on which the remote access controller is mounted. At block 745 and at 880, the CSR is transmitted to a remote validation service 820. In some embodiments, the hardware inventory and the CSR may be generated via a validation process 815 that operates within the IHS root of trust. In embodiments where the CSR is generated by a remote access controller such as described with regard to FIG. 2, the remote access controller may transmit the CSR to a remote validation service 820 without booting the operating system of the IHS and may utilize out-of-band data collection, networking and validated instructions to generate and transmit the CSR to the remove validation service.

In some embodiments, the remote validation service 820 receiving the CSR may be a service that is provided by the manufacturer of the IHS. In other embodiments, the remote validation service 820 may be supported by a trusted third-party that has been contracted to provide ongoing support of the IHS and which has been granted access to data such as the factory installed hardware of the IHS and hardware components that have been supplied by trusted entities 805 for installation in the IHS. At block 750, the validation service 820 receives the CSR that is transmitted by the IHS. The validation service 820 extracts the hardware inventory information included in the CSR and identifies the motherboard that is reported in this hardware inventory. At 885, the validation service 820 compares the identity of this motherboard reported in the CSR against the identity of the motherboard that was supplied by a trusted entity 805 to the customer at step 725 and at 865. If the identity of the reported motherboard matches the identity of the supplied motherboard, the customer may be assured that the installed motherboard is a genuine component that was supplied by a trusted entity 805. However, if the identity of the detected motherboard does not match the identity of the supplied motherboard, the validation service 820 may signal a core validation failure and may notify the customer that the installed motherboard could be a compromised component.

If the identity of the replacement motherboard specified in the CSR is successfully validated, at block 755, the validation service 820 may also validate the other detected hardware components of the IHS. In some embodiments, the validation service 820 may compare the hardware inventory information included in the CSR against the factory installed hardware inventory included in the original inventory certificate that was stored, at block 715, during factory provisioning of the IHS. As described with regard to FIGS. 5 and 6, such a comparison may identify any detected hardware components reported by the IHS that are not factory installed components and may also identify any factory installed components that are not reported as operating by the IHS. Also as described, any detected discrepancies may be reported for further investigation by the customer and certain discrepancies may signal a core validation failure that may be reported to the customer.

If the hardware inventory information reported in the CSR is validated as including only factory installed hardware components and genuine new/replacement components that were supplied by trusted entity, at block 760, the validation service 820 proceeds to generate a new signed inventory certificate that specifies the updated hardware inventory that was reported in the CSR. In some embodiments, the new signed inventory certificate that is generated by the validation service 820 may be signed by a factory certificate authority that utilizes a hardware security module, such as described with regard to FIGS. 3 and 4. In some embodiments, the new signed inventory certificate may be signed by a different certificate authority that is utilized by the manufacturer of the IHS or by a trusted entity 805 that is providing ongoing support of IHS.

At block 765 and at 890, the remote validation service 820 transmits the new signed inventory certificate to the IHS. In some embodiments, the remote access controller that generated the CSR may receive the new signed inventory certificate from the remote validation service 820. In some embodiments, the validation process 815 may be configured to halt further booting of an IHS until a new inventory certificate is provided in response to a CSR that is issued by the validation process 815. Upon detecting the receipt of a new inventory certificate, at block 770 and at 892, the hardware inventory information included in the new signed inventory certificate may be validated, at 895, by the validation process 815 as the same hardware inventory that was reported in the CSR. The validation process 815 may also validate the authenticity of the new certificate using the public key of the signing authority utilized by the validation service 820 in generating the new certificate. Upon successful validation of the hardware inventory, the validation process 815 may store the new signed inventory certificate to a persistent memory for use in continued validation of the detected hardware components of the IHS during its ongoing use by the customer, such as using the hardware validation process described with regard to FIGS. 5 and 6. For instance, the new inventory certificate may be periodically used to validate that the IHS continues to operate using only factory installed hardware components and hardware components supplied to the customer by a trusted entity 805.

As indicated in FIG. 7, in some instances, hardware components may be supplied for installation in an IHS, where these hardware components do not operate within the root of trust of the IHS. For instance, a defective storage drive or a defective network controller of a server IHS may be replaced with new components. In other instances, additional storage drives may be added to an IHS in order to expand its storage capabilities. In other instances, a hardware component of an IHS, such as a storage controller, may be replaced in order to upgrade the storage capabilities of the IHS. In these instances, such types of components are not motherboard components of an IHS such that their replacement or addition does not affect the cryptographic binding of an inventory certificate to the IHS. Accordingly, the root of trust of an IHS is not affected by replacement or addition of such components.

At block 775 and at 840, a new or replacement hardware component is supplied for installation in an IHS by a trusted entity 805, where the hardware component does not alter the cryptographic binding of an inventory certificate to the IHS. In various embodiments, the hardware component may be shipped to a customer for installation in an IHS or may be sold to a customer via a retail transaction. The component may be supplied by a trusted entity 805 that may include the manufacturer of the IHS, a retailer that sells replacement parts on behalf of the manufacturer or by a trusted third-party providing ongoing support of the IHS. At 840, the hardware component is received by the customer and is installed in the IHS. Once the component is installed and the IHS is initialized, in some embodiments, the hardware component may be detected by a hardware validation process 815, such as described with regard to FIGS. 5 and 6, and may be identified as a hardware component that is not present in the hardware inventory of the signed inventory certificate that is stored locally by the IHS. The user of the IHS may be notified of the non-validated hardware component and may be prompted to proceed while utilizing a non-validated component or to disable the component until it can be validated as a genuine component that was supplied by a trusted entity 805.

At 820, upon a new/replacement hardware component being supplied for installation in an IHS by a trusted entity 805, at block 780, a remote validation service 820 retrieves the signed inventory certificate stored, at block 715, during factory provisioning of the IHS. At block 785, the validation service updates the inventory certificate of the IHS to include the identity of the supplied hardware component. The updated inventory certificate may be re-signed, at block 790, by the factory certificate authority or by another certificate authority operated by a trusted entity 805 providing ongoing support of the IHS. The updated inventory certificate that has been re-signed may be transmitted, at block 765 and at 850, to the IHS by the validation service 820. In various embodiments, the updated inventory certificate may be received by the validation process 815 of the IHS. The updated inventory certificate may be stored to the persistent memory 810 of the IHS such that it replaces or augments the prior inventory certificate.

Upon receipt and retrieval, at 855, of the updated inventory certificate, at block 770, validation process 815, may initiate procedures for comparing the detected hardware inventory of the IHS against the inventory reported in the updated inventory certificate, such as described with regard to FIGS. 5 and 6. If, at 860, the detected hardware inventory of the IHS matches the inventory reported in the updated inventory certificate, the customer may be assured that the installed hardware component is a genuine component that was supplied by a trusted entity. However, if the new or replacement hardware component installed in the IHS is not identified in the inventory of the updated inventory certificate, the validation process 815 may notify the user that the IHS may be operating with a compromised component that was not supplied by a trusted entity 805. In this manner, the customer may validate that any modifications made to the hardware of an IHS are made using genuine components provided by trusted entities.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A method for validating hardware components of an IHS (Information Handling System), the method comprising:
   during factory provisioning of the IHS, generating an inventory certificate, where the certificate includes an inventory identifying a plurality of hardware components installed during factory assembly of the IHS;
   after the IHS is delivered and deployed, supplying a first hardware component for installation in the IHS;
   generating an update to the inventory certificate to identify the supplied first hardware component in the inventory of the certificate;
   transmitting the updated inventory certificate to the IHS;
   collecting, by a validation process of the IHS, an inventory of the detected hardware components of the IHS; and
   comparing the detected hardware components against the inventory from the updated inventory certificate in order to validate the detected hardware components include the supplied first hardware component.

2. The method of claim 1, wherein the supplying of the first hardware component comprises shipping the first hardware component for installation in the IHS or providing the first hardware component via a retail transaction.

3. The method of claim 1, wherein, during the factory provisioning of the IHS, the generated inventory certificate is uploaded to the IHS.

4. The method of claim 3, wherein the inventory certificate is uploaded to a persistent memory of the IHS during the factory provisioning of the IHS.

5. The method of claim 4, wherein the updated inventory certificate is uploaded to the persistent memory.

6. The method of claim 5, wherein the updated inventory certificate replaces prior versions of the inventory certificate or augments prior versions of the inventory certificate.

7. The method of claim 1, wherein the first hardware component comprises at least one of a storage drive, a network controller, an I/O controller, a power supply unit, a storage controller, a memory module, an FPGA (Field-Programmable Gate Array) card, a graphics card, a cooling component and a sensor.

8. The method of claim 1, wherein the validation process comprises a pre-boot process of the IHS.

9. The method of claim 1, wherein the comparison further comprises comparing the detected hardware components against the inventory from the updated inventory certificate in order to identify any discrepancies between the detected hardware components of the IHS and the hardware components installed during factory assembly of the IHS.

10. An IHS (Information Handling System) comprising:
    a persistent memory, wherein during factory provisioning of the IHS an inventory certificate is uploaded to the persistent memory, wherein the inventory certificate includes an inventory that identifies factory installed hardware components of the IHS,
    one or more processors;
    one or more memory devices coupled to the processors, the memory devices storing computer-readable instructions that, upon execution by the processors, cause a validation process of the IHS to:
    receive, once the IHS has been delivered and deployed, an update to the inventory certificate that identifies a first hardware component supplied for installation in the IHS;
    collect an inventory of detected hardware components of the IHS; and
    compare the detected hardware components against the inventory from the stored inventory certificate in order to validate the detected hardware components include the hardware components installed during factory assembly of the IHS, and also against the updated inventory certificate in order to validate the detected hardware components include the supplied first hardware component.

11. The IHS of claim 10, wherein the inventory included in the inventory certificate is based on a manifest of uniquely identified hardware components installed during the factory assembly of the IHS.

12. The IHS of claim 10, wherein the plurality of hardware components of the IHS further comprises a remote access controller, and wherein the inventory certificate is uploaded to the IHS via the remote access controller during the factory provisioning of the IHS.

13. The IHS of claim 10, wherein the updated inventory certificate replaces or augments the inventory certificate.

14. The IHS of claim 10, wherein the first hardware component comprises at least one of a storage drive, a network controller, an I/O controller, a power supply unit, a storage controller, a memory module, an FPGA (Field-Programmable Gate Array) card, a graphics card, a cooling component and a sensor.

15. The IHS of claim 10, wherein the validation process comprises a pre-boot process of the IHS.

16. A system for validating hardware components of an IHS (Information Handling System), the system comprising:
    a factory provisioning system, configured to generate an inventory certificate and to store the inventory certificate to the IHS, wherein the certificate includes an inventory of hardware components installed during factory assembly of the IHS;
    a remove validation system, configured to generate an update to the inventory certificate to identify a first hardware component supplied for installation in the IHS once the IHS has been delivered and deployed, and further configured to transmitting the updated inventory certificate to the IHS; and
    the IHS comprising one or more processors; and one or more memory devices coupled to the processors, the memory devices storing computer-readable instructions that, upon execution by the processors, cause a validation process of the IHS to:
    collect an inventory of detected hardware components of the IHS;
    compare the detected hardware components against the inventory from the inventory certificate in order to validate the detected hardware components include the hardware components installed during factory assembly of the IHS; and
    compare the detected hardware components against the updated inventory certificate in order to validate the detected hardware components include the supplied first hardware component.

17. The system of claim 16, wherein the supplied first hardware component comprises shipping the first hardware component for installation in the IHS or providing the first hardware component via a retail transaction.

18. The system of claim 16, wherein the inventory included in the inventory certificate is based on a manifest of uniquely identified hardware components installed during the factory assembly of the IHS.

19. The system of claim 16, wherein the first hardware component comprises at least one of a storage drive, a network controller, an I/O controller, a power supply unit, a storage controller, a memory module, an FPGA (Field-Programmable Gate Array) card, a graphics card, a cooling component and a sensor.

20. The system of claim 16, wherein the validation process comprises a pre-boot process of the IHS.

* * * * *